US011073116B1

(12) United States Patent
Dins et al.

(10) Patent No.: US 11,073,116 B1
(45) Date of Patent: Jul. 27, 2021

(54) COOLING SYSTEMS FOR MARINE ENGINES HAVING A SUPERCHARGER

(71) Applicant: Brunswick Corporation, Mettawa, IL (US)

(72) Inventors: David D. Dins, Mount Calvary, WI (US); Gregg D. Langenfeld, Fond du Lac, WI (US); Christopher R. Jenks, Rosendale, WI (US)

(73) Assignee: Brunswick Corporation, Mettawa, IL (US)

( * ) Notice: Subject to any disclaimer, the term of this patent is extended or adjusted under 35 U.S.C. 154(b) by 92 days.

(21) Appl. No.: 16/582,350

(22) Filed: Sep. 25, 2019

(51) Int. Cl.
| | |
|---|---|
| *F02M 35/10* | (2006.01) |
| *B63H 20/28* | (2006.01) |
| *F01P 3/20* | (2006.01) |
| *F02B 29/04* | (2006.01) |
| *B63H 21/38* | (2006.01) |
| *F01N 3/02* | (2006.01) |

(52) U.S. Cl.
CPC ..... *F02M 35/10157* (2013.01); *B63H 20/285* (2013.01); *B63H 21/383* (2013.01); *F01N 3/0205* (2013.01); *F01P 3/202* (2013.01); *F02B 29/0462* (2013.01); *F01N 2590/021* (2013.01); *F01N 2610/1453* (2013.01)

(58) Field of Classification Search
CPC . B63H 20/285; B63H 21/383; F02B 29/0462; F02B 29/0475; F02D 23/00; F02D 23/005; F02D 23/02; F02M 35/10157; F01N 3/0205; F01N 2590/021; F01N 2610/1453; F01P 3/202; F01P 2050/12; F01P 2060/02
See application file for complete search history.

(56) References Cited

U.S. PATENT DOCUMENTS

| | | | |
|---|---|---|---|
| 2,306,554 | A | 12/1942 | Morchouse |
| 2,551,307 | A | 5/1951 | Yingling |
| 3,636,911 | A | 1/1972 | Piazza |
| 3,877,447 | A | 4/1975 | Ross |
| 4,117,907 | A | 10/1978 | Lechler |
| D276,811 | S | 12/1984 | Wolfe |
| 4,496,326 | A | 1/1985 | Boda |
| 4,521,201 | A | 6/1985 | Watanabe |
| 4,582,493 | A | 4/1986 | Toyohara |

(Continued)

FOREIGN PATENT DOCUMENTS

EP  3225809  4/2017

*Primary Examiner* — Ajay Vasudeva
(74) *Attorney, Agent, or Firm* — Andrus Intellectual Property Law, LLP

(57) ABSTRACT

A cooling system is for cooling a marine engine having an engine block and a cylinder head, and a supercharger configured to provide charge air for combustion in the marine engine. The cooling system has a charge air cooler configured to cool the charge air prior to combustion in the marine engine. The cooling system is configured to circulate cooling water from a body of water in which the marine engine is operating to the marine engine and then back to the body of water. The cooling system is further configured to convey the cooling water in parallel to the marine engine and the charge air cooler. A sprayer is configured to spray the cooling water into exhaust gas discharged from the marine engine. The cooling system is configured to convey the cooling water in series to the charge air cooler and then to the sprayer.

24 Claims, 14 Drawing Sheets

(56) References Cited

U.S. PATENT DOCUMENTS

| | | | |
|---|---|---|---|
| 4,650,429 A | 3/1987 | Boda | |
| 4,701,141 A | 10/1987 | Sumigawa | |
| 4,716,735 A | 1/1988 | Ruf | |
| D295,867 S | 5/1988 | Walsh | |
| 4,878,468 A | 11/1989 | Boda et al. | |
| 4,964,378 A | 10/1990 | Tamba | |
| 5,143,028 A | 9/1992 | Takahashi | |
| 5,145,427 A | 9/1992 | Kawai | |
| 5,261,356 A | 11/1993 | Takahashi | |
| 5,340,342 A | 8/1994 | Boda et al. | |
| 5,632,657 A | 5/1997 | Henderson | |
| D380,478 S | 7/1997 | Robbins | |
| 5,911,610 A | 6/1999 | Fujimoto | |
| 6,010,563 A | 1/2000 | Taketani | |
| 6,020,563 A | 2/2000 | Risk, Jr. | |
| 6,093,066 A | 7/2000 | Isogawa | |
| 6,146,221 A | 11/2000 | Natsume | |
| 6,264,516 B1 | 7/2001 | McEathron et al. | |
| 6,405,692 B1 * | 6/2002 | Christiansen | F02B 29/0418 123/65 BA |
| 6,406,342 B1 | 6/2002 | Walczak et al. | |
| 6,408,832 B1 | 6/2002 | Christiansen | |
| 6,446,592 B1 | 9/2002 | Wilksch | |
| 6,676,464 B2 * | 1/2004 | Gokan | F02B 29/0437 440/39 |
| 6,688,928 B2 | 2/2004 | Gokan et al. | |
| 6,783,412 B1 | 8/2004 | Wynveen et al. | |
| 6,821,171 B1 * | 11/2004 | Wynveen | F01P 3/207 440/88 C |
| 6,902,450 B2 | 6/2005 | Ohtsuki et al. | |
| 7,082,932 B1 | 8/2006 | Crane | |
| 7,090,551 B1 | 8/2006 | Lokken et al. | |
| D527,737 S | 9/2006 | Iekura | |
| 7,100,584 B1 | 9/2006 | Bruestle et al. | |
| 7,214,113 B2 | 5/2007 | Kojima | |
| D552,129 S | 10/2007 | Steinberg | |
| 7,318,396 B1 * | 1/2008 | Belter | F01P 3/202 123/41.29 |
| 7,455,558 B2 | 11/2008 | Yander | |
| 7,458,868 B2 | 12/2008 | Mineo | |
| D611,501 S | 3/2010 | Vignau et al. | |
| D611,502 S | 3/2010 | Vignau et al. | |
| 7,677,938 B2 | 3/2010 | Wiatrowski et al. | |
| 7,704,110 B2 | 4/2010 | Wiatrowski et al. | |
| 7,806,110 B1 | 10/2010 | Broman et al. | |
| 7,895,959 B1 | 3/2011 | Angel et al. | |
| D655,308 S | 3/2012 | Steinberg | |
| 8,257,122 B1 | 9/2012 | Holley | |
| 8,479,691 B1 | 7/2013 | Taylor et al. | |
| 8,651,906 B1 | 2/2014 | Morton | |
| 9,057,314 B1 | 6/2015 | Eichinger et al. | |
| 9,086,009 B2 * | 7/2015 | Mikame | F01P 3/202 |
| 9,359,058 B1 | 6/2016 | Langenfeld et al. | |
| 9,365,274 B1 * | 6/2016 | George | F01N 3/043 |
| 9,403,588 B1 | 8/2016 | George et al. | |
| 9,422,045 B2 | 8/2016 | Kinpara | |
| 9,616,987 B1 | 4/2017 | Langenfeld et al. | |
| 9,650,937 B1 | 5/2017 | George et al. | |
| 9,903,251 B1 | 2/2018 | Belter et al. | |
| 10,047,661 B1 | 4/2018 | Torgerud | |
| D834,618 S | 11/2018 | Zin et al. | |
| 10,150,548 B2 | 12/2018 | Ochiai et al. | |
| 10,202,888 B2 | 2/2019 | Wicks | |
| 10,233,818 B1 | 3/2019 | Reichardt et al. | |
| 10,293,901 B1 | 5/2019 | Sitton | |
| 10,336,428 B1 | 7/2019 | Novak et al. | |
| 2001/0039908 A1 | 11/2001 | Bilek | |
| 2004/0137806 A1 | 7/2004 | Ohtsuki | |
| 2009/0320772 A1 | 12/2009 | Hirose | |
| 2010/0132355 A1 | 6/2010 | Michels et al. | |
| 2017/0032826 A1 | 2/2017 | Li et al. | |
| 2017/0328265 A1 | 11/2017 | George et al. | |

* cited by examiner

COOLING SYSTEMS FOR MARINE ENGINES HAVING A SUPERCHARGER

FIELD

The present disclosure generally relates to marine engines having a supercharger, and to cooling systems for marine engines having a supercharger, for example marine engines for outboard motors.

BACKGROUND

The following U.S. patents and publication are incorporated herein by reference in entirety:

U.S. Pat. No. 10,336,428 discloses a marine propulsion device having an internal combustion engine, an exhaust manifold that conveys exhaust gas from the internal combustion engine, and a cooling water sprayer that is configured to spray a flow of cooling water radially outwardly toward an inner diameter of the exhaust manifold. The cooling water sprayer has a sprayer body that is configured to convey the flow of cooling water radially into the exhaust manifold and a nozzle configured to spray the flow of cooling water radially outwardly in a fan-shaped pattern toward the inner diameter of the exhaust manifold.

U.S. Pat. No. 10,293,901 discloses a cooling system for a marine engine. The cooling system has a cooling fluid conduit that is configured to convey cooling fluid for cooling at least one component of the marine engine; a strainer disposed in the cooling fluid conduit and configured to strain the cooling fluid; and a quick connector that is manually operable to connect and disconnect the strainer from the cooling fluid conduit.

U.S. Pat. No. 10,233,818 discloses a marine propulsion device including an internal combustion engine; an axially elongated exhaust conduit that conveys exhaust gas from the upstream internal combustion engine to a downstream outlet; a cooling water sprayer that is configured to spray a flow of cooling water radially outwardly toward an inner diameter of the axially elongated exhaust conduit; a temperature sensor located downstream of the cooling water sprayer and configured to sense temperature of the exhaust gas and cooling water; and a controller configured to identify a fault condition associated with the cooling water sprayer based on the temperature of the exhaust gas and cooling water.

U.S. Pat. No. 10,047,661 discloses a fuel module apparatus for a marine engine. The fuel module apparatus includes a housing having a fuel cavity and a fuel pump in the housing. The fuel pump is configured to pump fuel through the fuel cavity from an inlet on the housing to an outlet on the housing. A cooling fluid sprayer sprays cooling fluid onto an outer surface of the housing to thereby cool the housing and the fuel in the fuel cavity.

U.S. Pat. No. 9,650,937 discloses a system for cooling an engine of a marine propulsion system having an engine and having a cylinder block. An exhaust manifold that conveys hot exhaust gases from the engine and a pump that pumps water from a body of water are also present in the system. A water jacket surrounding the exhaust manifold conveys water from the pump along at least one stream of water having a cross sectional area for cooling the hot exhaust gases in the exhaust manifold. At least one portion of the water jacket includes at least one converging passageway including a wall of the water jacket that tapers inwardly to reduce the cross-sectional area of the stream of water as the water circulates in the water jacket. The pumped water typically has entrained air in the form of air pockets. The converging passageway reduces the air pockets present in the water to provide even cooling of the manifold.

U.S. Pat. No. 9,616,987 discloses a marine engine including a cylinder block having first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

U.S. Pat. No. 9,403,588 discloses systems for cooling a marine engine that is operated in a body of water. The systems can include an open loop cooling circuit for cooling the marine engine, wherein the open loop cooling circuit is configured to convey cooling water from the body of water to the marine engine so that heat is exchanged between the cooling water and the marine engine, and a pump that is configured to pump the cooling water from upstream to downstream through the open loop cooling circuit. A heat exchanger is configured to cause an exchange of heat between the cooling water located upstream of the marine engine and the cooling water located downstream of the marine engine to thereby warm the cooling water located upstream of the marine engine, prior to cooling the marine engine.

U.S. Pat. No. 9,365,274 discloses an outboard marine propulsion device having an internal combustion engine with a cylinder head, a cylinder block and an exhaust manifold that discharges exhaust gases from the engine towards a vertically elongated exhaust tube. The exhaust manifold has a plurality of inlet runners that receive the exhaust gases from the engine, and a vertically extending collecting passage that conveys the exhaust gases from the plurality of inlet runners upwardly to a bend that redirects the exhaust gases downwardly towards the exhaust tube. A cooling water jacket is on the exhaust manifold and conveys cooling water alongside the exhaust manifold. A catalyst housing is coupled to the exhaust manifold and a cooling water jacket is on the catalyst housing and carries cooling water alongside the catalyst housing. A catalyst is disposed in the catalyst housing.

U.S. Pat. No. 9,359,058 discloses an outboard marine propulsion device having an internal combustion engine. At least one engine cooling passage conveys cooling water through the internal combustion engine. An exhaust manifold comprises a plurality of exhaust runners and an exhaust log. The plurality of exhaust runners axially conveys exhaust gases from the internal combustion engine to the exhaust log. A cooling jacket on the exhaust manifold comprises an exhaust log cooling jacket that conveys the cooling water along an outer surface of the exhaust log and a plurality of exhaust runner cooling passages that each axially convey the cooling water along an outer surface of a respective one of the plurality of exhaust runners from the exhaust log cooling jacket to the engine cooling passage.

U.S. Pat. No. 9,057,314 discloses an elongated exhaust conduit having a first end receiving hot exhaust gas from a marine engine and a second end discharging the exhaust gas. An elongated cooling water jacket extends adjacent to the exhaust conduit. The cooling water jacket conveys the raw cooling water adjacent to the exhaust conduit to thereby cool the exhaust conduit and warm the raw cooling water therein and discharges the warmed cooling water to cool the marine engine. The cooling water jacket comprises first and second channels that are separate from each other. The cooling water is oriented in a helical flow around the exhaust conduit.

U.S. Pat. No. 8,651,906 discloses an apparatus for intake of air to an outboard motor including an inlet receiving a mixture of air and water from atmosphere surrounding the outboard motor and an outlet discharging the air. A conduit extends between the inlet and the outlet. The conduit has a vertically downwardly oriented first flow path, a vertically upwardly oriented second flow path, and a junction joining the first and second flow paths. The junction is oriented with respect to the first and second flow paths such that both centrifugal and gravitational forces separate the water from the air as the mixture flows there through.

U.S. Pat. No. 8,479,691 discloses a cooling system for a marine engine provided with various cooling channels which allow the advantageous removal of heat at different rates from different portions of the engine. A split flow of water is conducted through the cylinder head, in opposite directions, to individually cool the exhaust port and intake ports at different rates. This increases the velocity of coolant flow in the downward direction through the cylinder head to avoid the accumulation of air bubbles and the formation of air pockets that could otherwise cause hot spots within the cylinder head. A parallel coolant path is provided so that a certain quantity of water can bypass the engine block and avoid overcooling the cylinder walls.

U.S. Pat. No. 7,806,110 discloses a marine propulsion device provided with a turbocharger that is located above all, or at least a majority of, the cylinders of an engine. The exhaust gases are directed to one side of the engine and the compressed air is directed to an opposite side of the engine. The turbocharger is located at a rear portion of the engine behind the crankshaft.

U.S. Pat. No. 7,100,584 discloses an engine control system that determines a desired temperature range of air flowing into an intake manifold of the engine as a function of an operating characteristic, such as the load on the engine or the operating speed of the engine. A bypass conduit is provided in parallel with a heat exchanger, wherein both the bypass conduit and the heat exchanger are connected to an outlet of a compressor to direct air from the compressor to an intake manifold along the parallel paths. By manipulating an air valve in the bypass conduit, an engine control unit can regulate the temperature at an inlet of the intake manifold. A desired temperature is selected from a matrix of stored values as a function of the load on the engine and the engine operating speed.

U.S. Pat. No. 7,082,932 discloses a method in which a marine propulsion system with a charge air compressor is controlled through the use of a clutch or a multiple speed transmission that allows the charge air compressor to be engaged or disengaged. The engagement or disengagement of the charge air compressor can be a dual function of the demand for a change in torque and the engine speed.

U.S. Pat. No. 6,821,171 discloses a cooling system for a marine engine that conducts water from a coolant pump through the cylinder head and exhaust conduit prior to conducting the cooling water through the cylinder block. This raises the temperature of the water prior to its entering the cooling passages of the cylinder block.

U.S. Pat. No. 6,783,412 discloses a cooling water distribution system that provides a single cavity from which water is directed to a plurality of auxiliary devices. The cavity is formed within a housing structure that has a perforate surface shaped to be inserted into a primary water conducting channel through which water flows from a water pump to an internal combustion engine. The perforate surface does not extend into the water stream induced by the water pump but, instead, is shaped to conform to an inner surface of the water conducting cavity. Holes in the perforate surface are shaped to allow water to flow from the main channel of the water conducting cavity into the cavity of the housing structure from which the water is distributed through a plurality of water conduits to various auxiliary devices requiring cooling water.

U.S. Pat. Nos. 6,408,832 and 6,405,692 disclose an outboard motor with an engine having a screw compressor which provides a pressurized charge for the combustion chambers of the engine. The screw compression has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. A charge air cooler is used in a preferred embodiment and the bypass conduit then extends between the cold side plenum of the charge air cooler and the inlet of the compressor. The charge air cooler improves the operating efficiency of the engine and avoids overheating the air as it passes through the supercharger after flowing through the bypass conduit. The bypass valve is controlled by an engine control module in order to improve power output from the engine at low engine speeds while avoiding any violation of existing limits on the power of the engine at higher engine speeds.

U.S. Design Pat. No. D834,618 discloses a cowl for a marine engine having port and starboard air intake ports.

U.S. Patent Publication No. 2017/0328265 discloses an open loop cooling water system for a marine engine. A cooling water inlet receives cooling water from a body of water. A cooling water outlet discharges the cooling water back to the body of water. A cooling water circuit conveys cooling water from the cooling water inlet, through the marine engine, and to the cooling water outlet. A cooling water pump that pumps cooling water from upstream to downstream through the cooling water circuit. A recirculation pump that is located in the cooling water circuit downstream of at least one component of the marine engine and upstream of the cooling water outlet. The recirculation pump is configured to pump cooling water from downstream of the marine engine back into the cooling water circuit upstream of the marine engine. Methods are for cooling a marine engine using an open loop cooling system.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain examples disclosed herein, a cooling system is for cooling a marine engine having an engine block and a cylinder head, and a supercharger configured to provide charge air for combustion in the marine engine. The cooling system has a charge air cooler configured to cool the charge air prior to combustion in the marine engine. The cooling system is configured to circulate cooling water from a body of water in which the marine engine is operating to the marine engine and then back to the body of water. The cooling system is further configured to convey the cooling water in parallel to the marine engine and the charge air cooler. A sprayer is configured to spray the cooling water into exhaust gas discharged from the marine engine. The cooling system is configured to convey the cooling water in series to the charge air cooler and then to the sprayer. The cooling system is further configured to convey the cooling water from the charge air cooler in parallel to a control valve and to the sprayer. The control valve is configured to automatically discharge the cooling water to the cooling passage for cooling the supercharger at a predetermined operating pressure of the cooling system.

BRIEF DESCRIPTION OF THE DRAWINGS

Examples of marine engines having a supercharger are described with reference to the following drawing figures. The same numbers are used throughout to reference like features and components.

DETAILED DESCRIPTION

Figure 3:
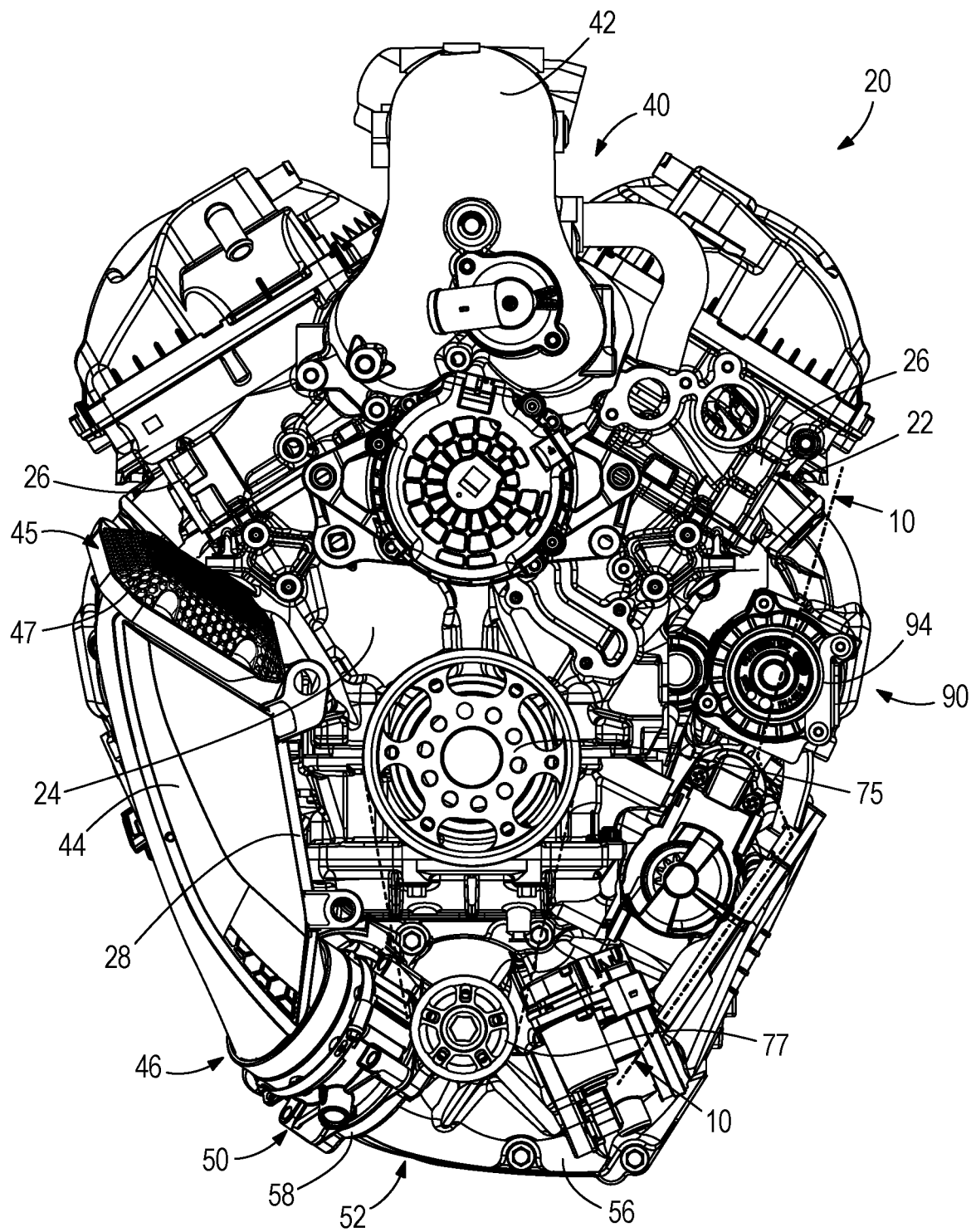
FIG. 3 is a top view of the marine engine.
Figure 4:
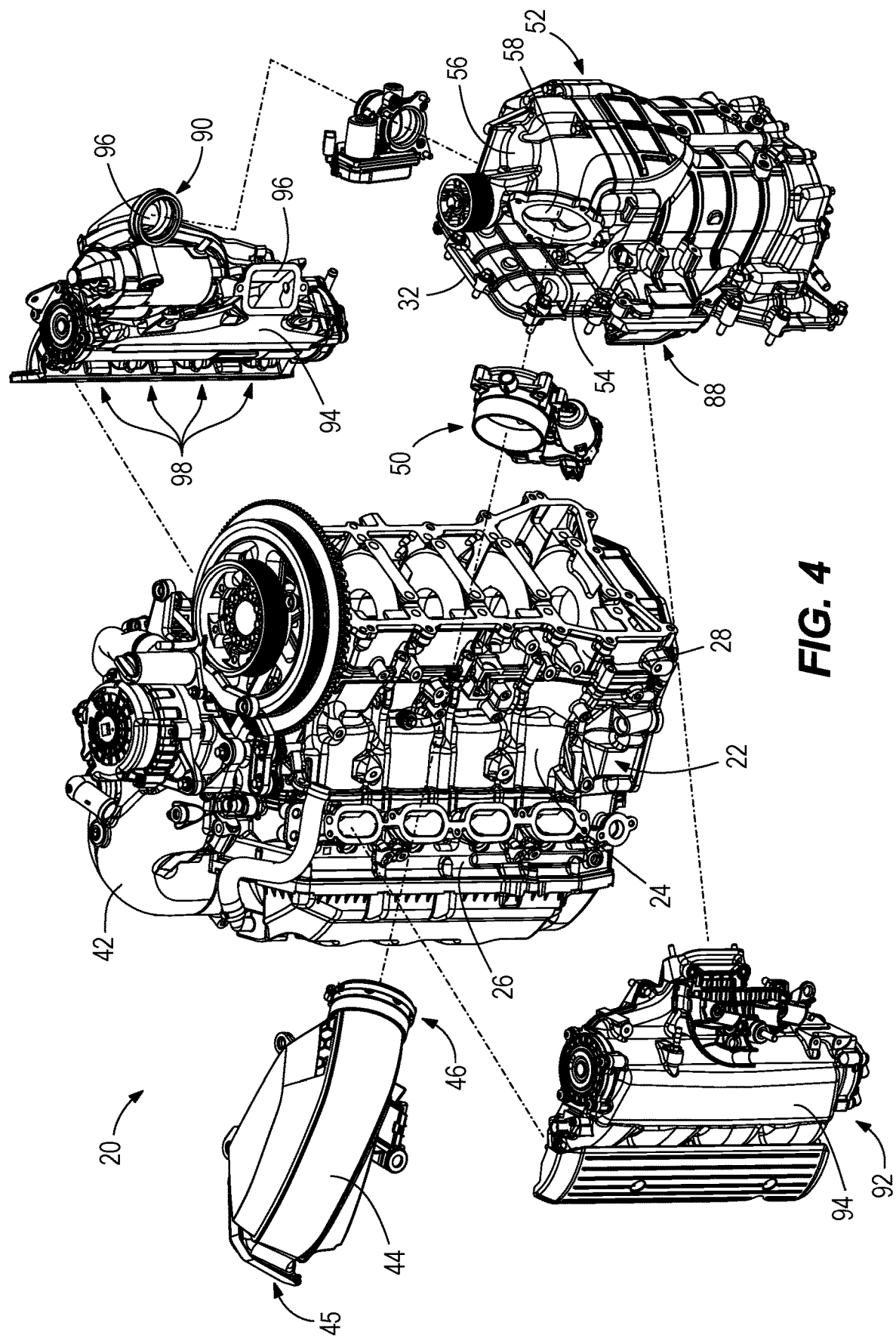
FIG. 4 is starboard side front perspective and exploded view of the marine engine.
Figure 5:
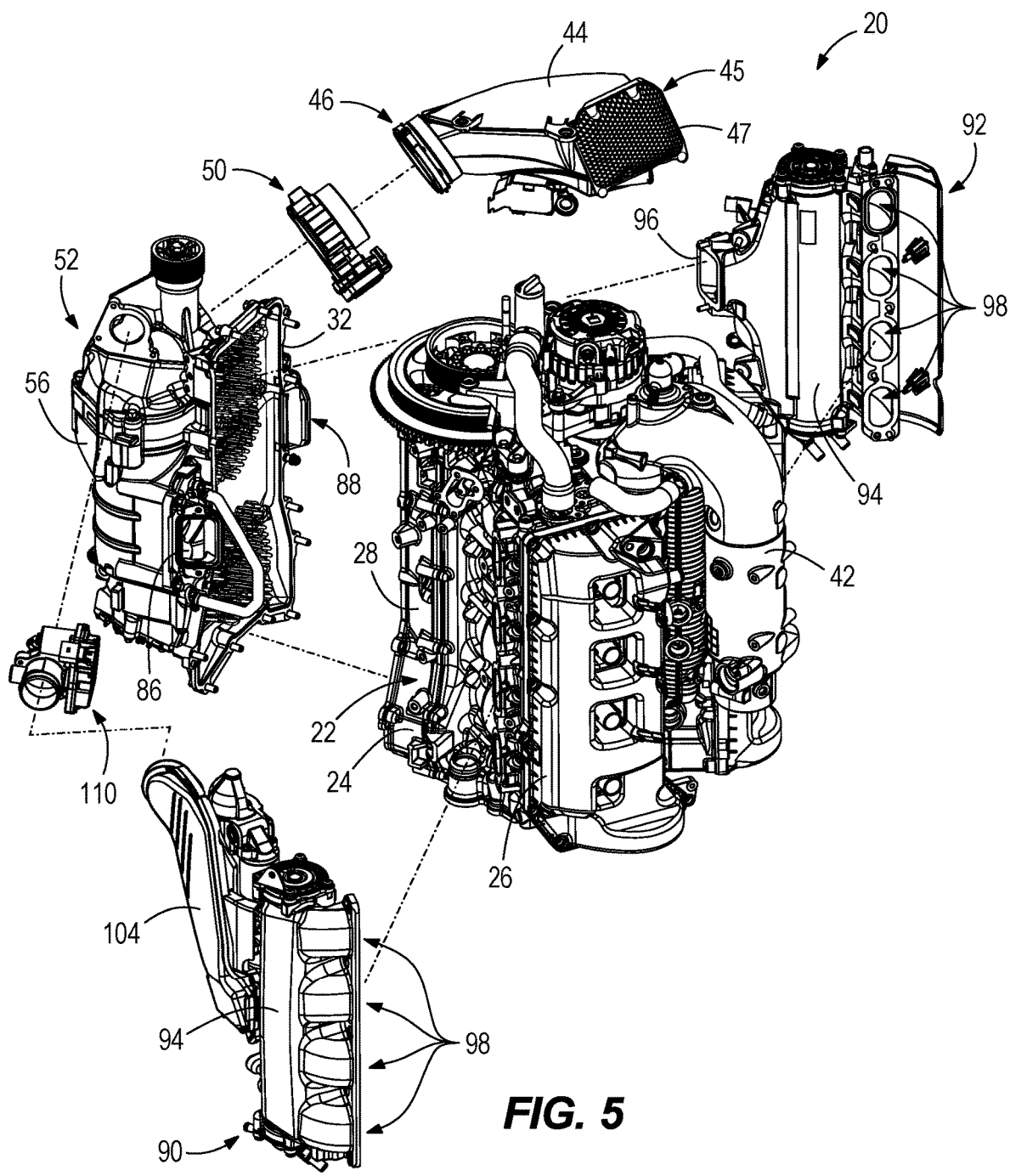
FIG. 5 is a port side rear perspective and exploded view of the marine engine.
Figure 6:
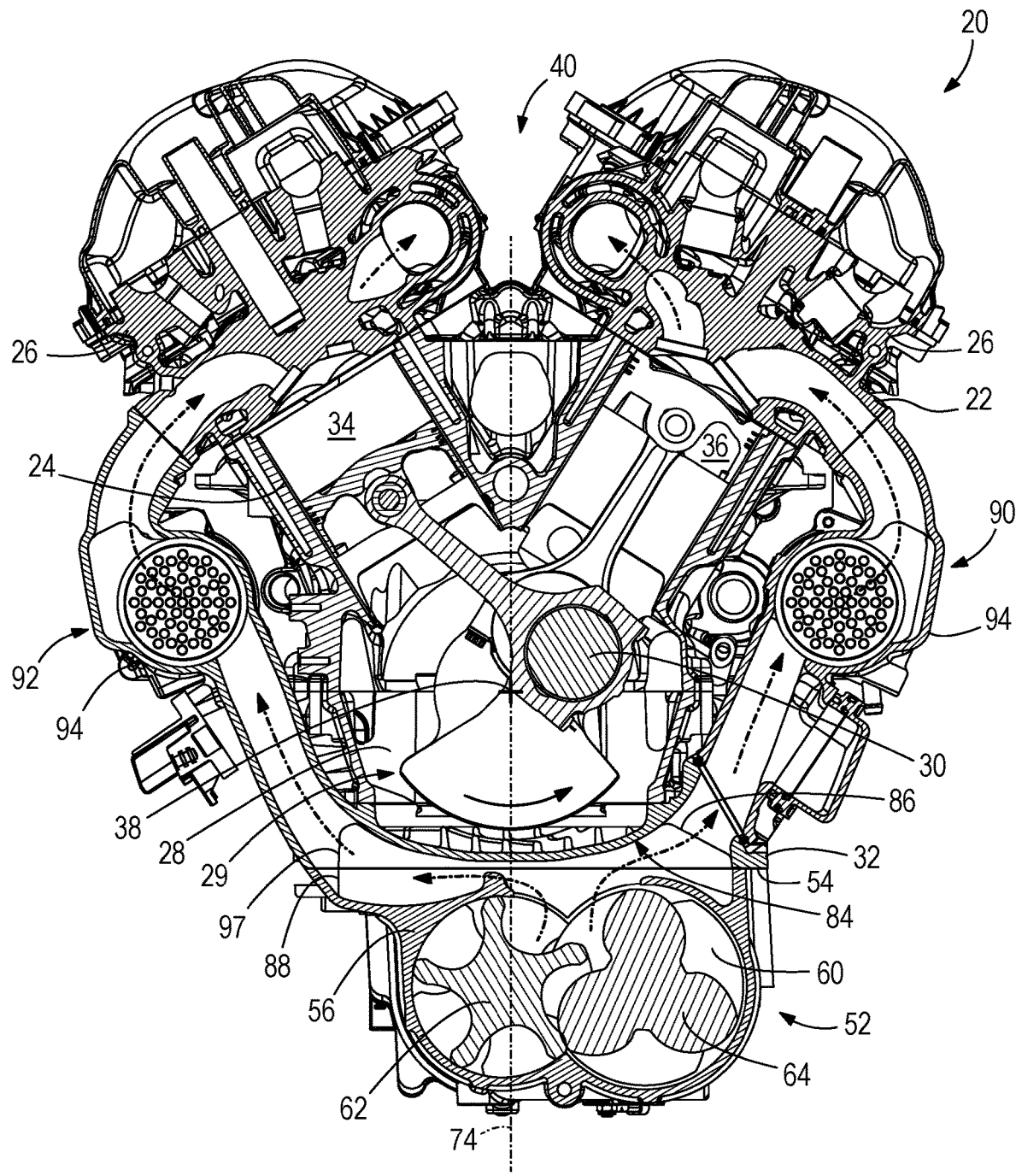
FIG. 6 is a view of Section 6-6, shown in FIG. 1.
Figure 12:
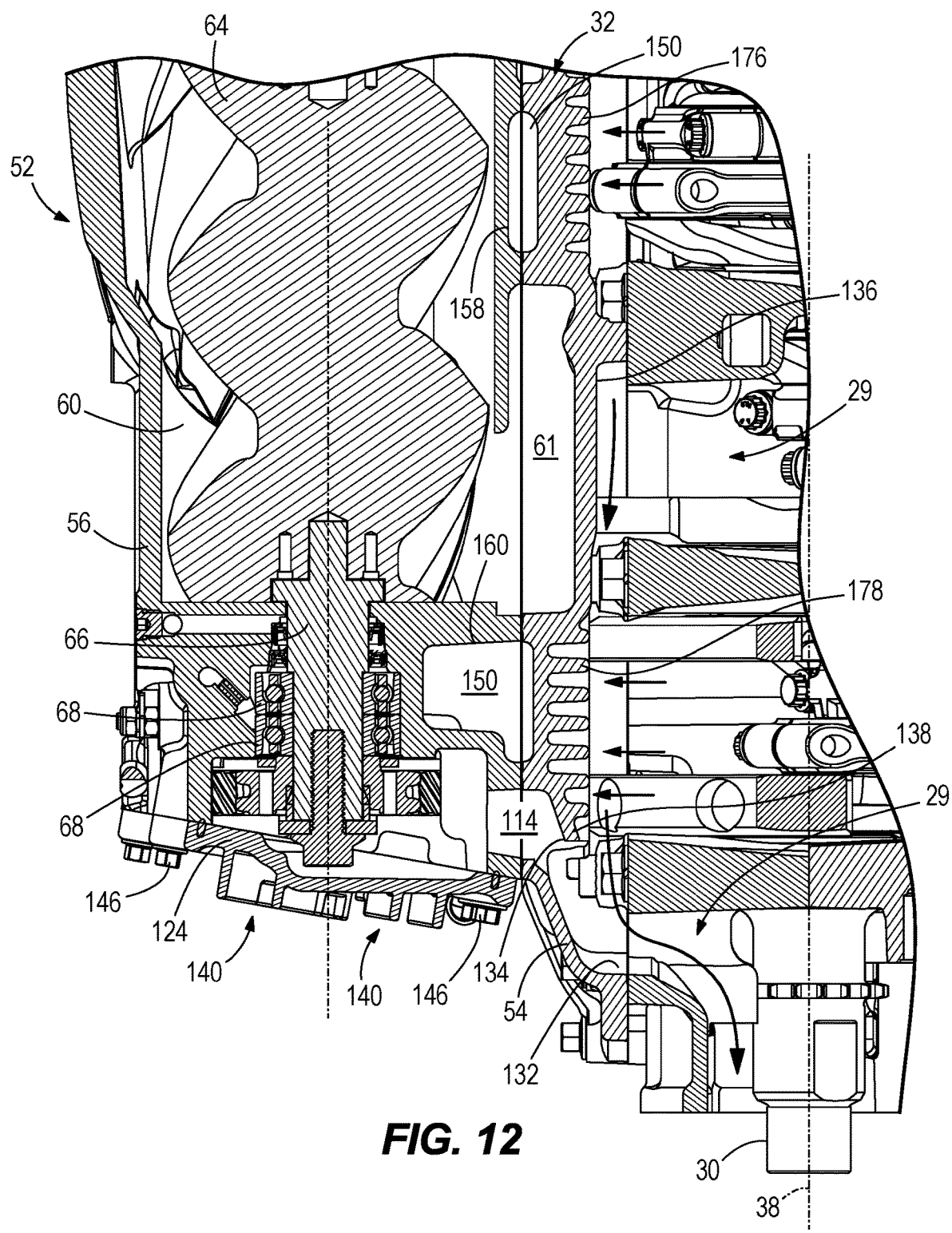
FIG. 12 is a view of Section 12-12, shown in FIG. 11.

FIGS. 1-6 depict a marine engine 20 for use in an outboard motor. The marine engine 20 includes a powerhead 22 having an engine block 24, cylinder heads 26 and a crankcase 28 having a crankcase cavity 29 containing a crankshaft 30 (which is shown in FIGS. 6 and 12). Referring to FIGS. 4-6, a crankcase cover 32 encloses the crankshaft 30 in the crankcase 28. Similar to what is disclosed in the presently-incorporated U.S. Pat. No. 9,616,987, the engine block 24 has first and second banks of cylinders 34, 36 (see FIG. 6), which are disposed along a longitudinal crankshaft axis 38 (see FIG. 12). The first and second banks of cylinders 34, 36 extend transversely with respect to each other in a V-shape so as to define a valley 40 there between (see FIGS. 3 and 6). An exhaust conduit 42 conveys exhaust gas from the marine engine 20 for discharge to atmosphere. The exhaust conduit 42 (see FIGS. 1-5) is centrally located in the valley 40 and receives the exhaust gas from the first and second banks of cylinders 34, 36 via the cylinder heads 26. The exhaust conduit 42 first conveys the exhaust gas upwardly relative to the crankshaft axis 38, reverses direction, and then conveys the exhaust gas downwardly relative to the crankshaft axis 38. As is conventional, the combustion process in the marine engine 20 causes rotation of the crankshaft 30, which in turn causes rotation of a corresponding driveshaft, propeller shaft, and propeller configured to propel a marine vessel in water. The above-incorporated U.S. Pat. No. 9,616,987 discloses this type of arrangement in more detail.

Figure 1:
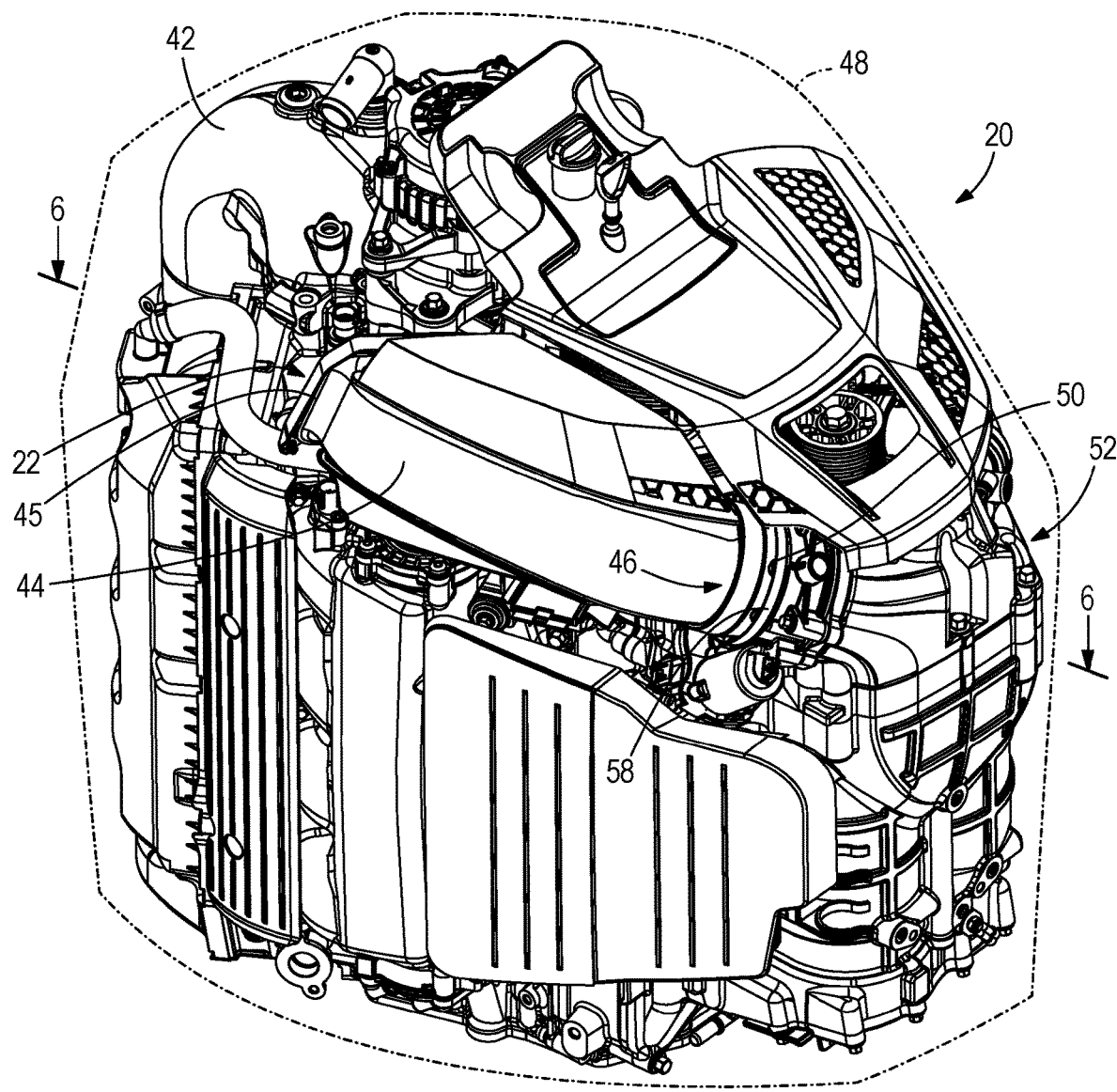
FIG. 1 is a starboard side front perspective view of a marine engine for propelling a marine vessel in water.
Figure 2:
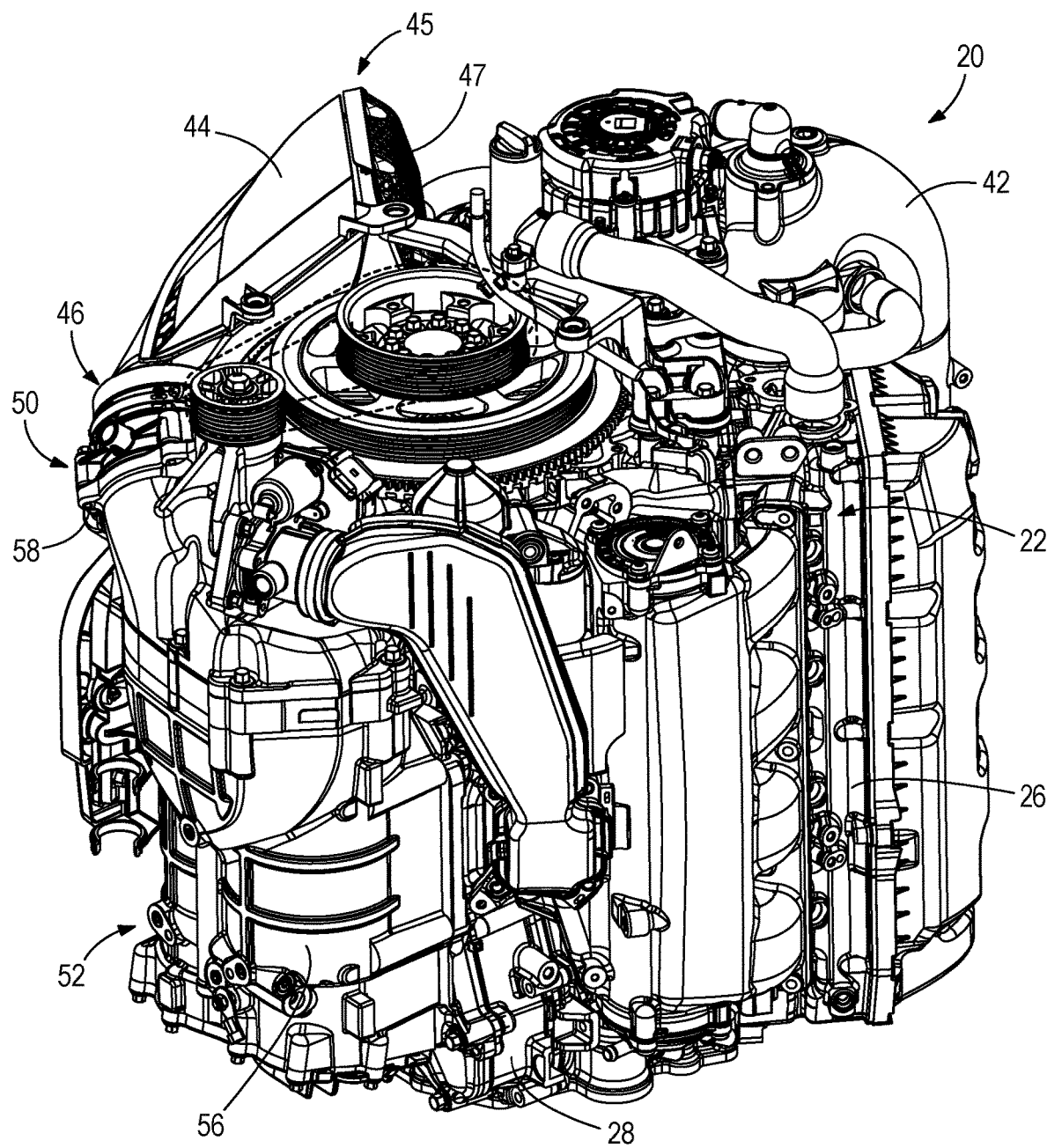
FIG. 2 is a port side front perspective view of the marine engine shown in FIG. 1.

Referring to FIGS. 1-5, the marine engine 20 receives intake air for combustion via an intake muffler 44 located along the starboard side of the marine engine 20. The intake muffler 44 is an elongated, inwardly curved body with an upstream inlet 45 and a downstream outlet 46. A filter or screen 47 is disposed on the upstream inlet 45 and is configured to filter particulate matter out of the incoming ambient air, which is received via an intake opening (not shown) on the aftward side of a cowling 48 (see FIG. 1) enclosing the marine engine 20. The cowling 48 is schematically shown in FIG. 1, and a suitable cowling having intake openings is shown in more detail in the above-incorporated U.S. Design Pat. No. D834,618. The interior of the intake muffler 44 is not shown in the drawings, but can include one or more expansion chambers and/or expansion passages for allowing expansion of the intake air and attenuation of sound generated by the intake air. The downstream outlet 46 is coupled to a throttle body 50 having a throttle valve for controlling flow of intake air to the powerhead 22, as is conventional. In certain examples, opening and closing of the throttle valve can be controlled by a computer controller, such as an engine control unit (ECU), as is conventional.

During research and experimentation, the present applicant endeavored to provide a supercharged marine engine 20 for use in an outboard motor, in a relatively small-sized package. Conventionally, supercharged outboard motors have a discharge port for discharging charge air that is located on the side of the supercharger that is directed away from the engine block so as to avoid overheating of the supercharger and/or engine block. However the present applicant realized that this outward-facing discharge port is not conducive to a small package size since the charge air ultimately needs to be conveyed to the cylinder heads. For example, the charge air leaving the supercharger must be ducted around a sealing flange, and around the perimeter of the supercharger, before it is ducted along the sides of the engine to a charge air cooler and then the cylinder head. As described in the present disclosure, the present applicant invented a marine engine having a supercharger that discharges charge air towards the engine block and heads, thus advantageously providing a relatively smaller package size. Such an orientation for the charge air discharge is not convention and in fact counterintuitive. Various inventive concepts are presently disclosed that relate to this concept and also that are separate and distinct from this concept.

Figure 11:
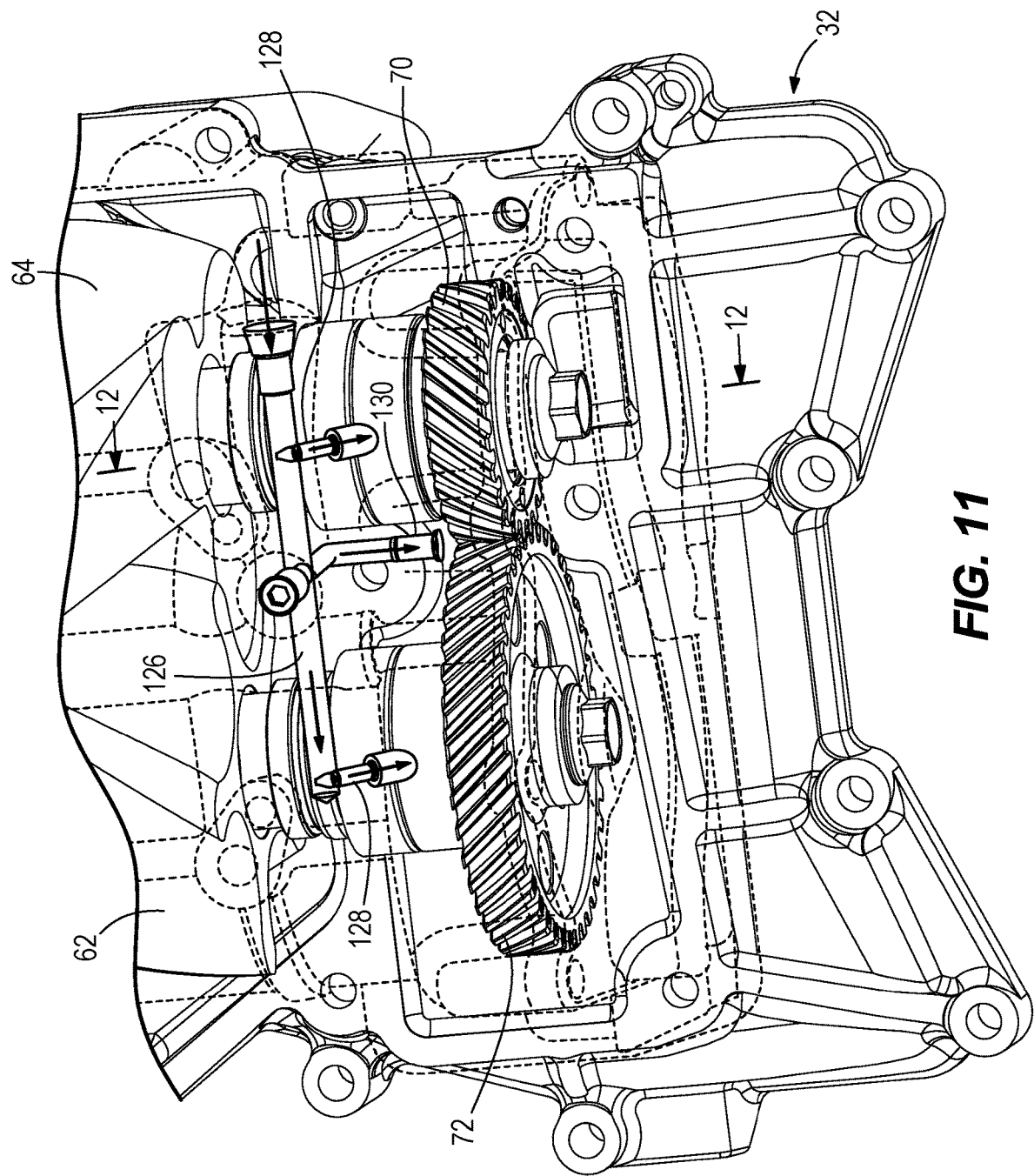
FIG. 11 is a view of a lubrication apparatus for the supercharger, showing portions of the supercharger in phantom line.

Referring to FIGS. 6-9, according to the present disclosure, the marine engine 20 includes a novel supercharger 52 mounted on an exterior mounting surface 54 of the crankcase cover 32, i.e., forwardly of the marine engine 20. The supercharger 52 and crankcase cover 32 are separate components that are mounted together by fasteners, as shown by dash-and-dot lines in FIG. 9. In other (not shown) examples, the supercharger 52 and crankcase cover 32 are formed together as a monolithic component. The supercharger 52 is configured to increase the pressure of the intake air in a conventional manner so as to provide pressurized intake air, which is known in the art as "charge air", for combustion in the marine engine 20. In particular, the supercharger 52 has a body 56 that is elongated with respect to the crankshaft axis 38 (see FIG. 12), an intake air inlet 58 (see FIG. 9) located on an upper starboard side of the body 56, and a centrally-located charge air outlet 61 (see FIGS. 8 and 9) for conveying higher-pressure charge air from the supercharger 52 for combustion in the powerhead 22. The configuration of the charge air outlet 61 is novel and is further described herein below. The supercharger 52 also includes a supercharger cavity 60 (see FIG. 6) containing first and second rotors 62, 64, that are adjacent to each other and elongated with respect to the crankshaft axis 38. Each rotor 62, 64 has a plurality of vanes configured such that rotation of the rotors 62, 64 compresses and thereby increases the pressure of the intake air received via the intake air inlet 58 and so as to discharge charge air via the noted charge air outlet 61, as will be further described herein below. Referring to FIGS. 11 and 12, the rotors 62, 64 each have a supporting shaft 66 which is supported for rotation relative to the body 56 of the supercharger 52 via bearings 68. Meshed gears 70, 72 (see FIG. 11) connect the rotors 62, 64 together such that the rotors 62, 64 rotate together. Meshed gears 70, 72 are located below the rotors 62, 64 and thus as further described herein below receive and are lubricated by the lubricant draining down the supercharger cavity 60. Referring to FIG. 3, a drive pulley 75 connected to the top of the crankshaft 30 causes rotation of a driven pulley 77 connected to the rotor 62, which is coupled to meshed gear 72 (see FIG. 11). Meshed gear 72 drives meshed gear 70, which is coupled to the rotor 64. Thus, the rotors 62, 64 rotate in a synchronization without touching each other. The manner in which the rotors 62, 64 are caused to rotate can vary from that which is shown and described.

Referring to FIGS. 6-9, the body 56 of the supercharger 52 has a forward side and an opposite, aftward side that is coupled to the exterior mounting surface 54 of the crankcase cover 32 via fasteners. The charge air outlet 61 is located on the aftward side of the supercharger 52 and is oriented so as to discharge charge air towards the powerhead 22, i.e., towards the crankshaft axis 38. This is most clearly shown in FIG. 6. The charge air outlet 61 is located generally between the rotors 62, 64 and the crankcase 28 and consists of a central duct that extends aftwardly, through both the body 56 of the supercharger 52 and through an outer portion of the crankcase cover 32. The charge air outlet 61 generally extends along an outlet axis 74 that intersects the crankshaft axis 38, as shown in FIG. 6.

Figure 8:
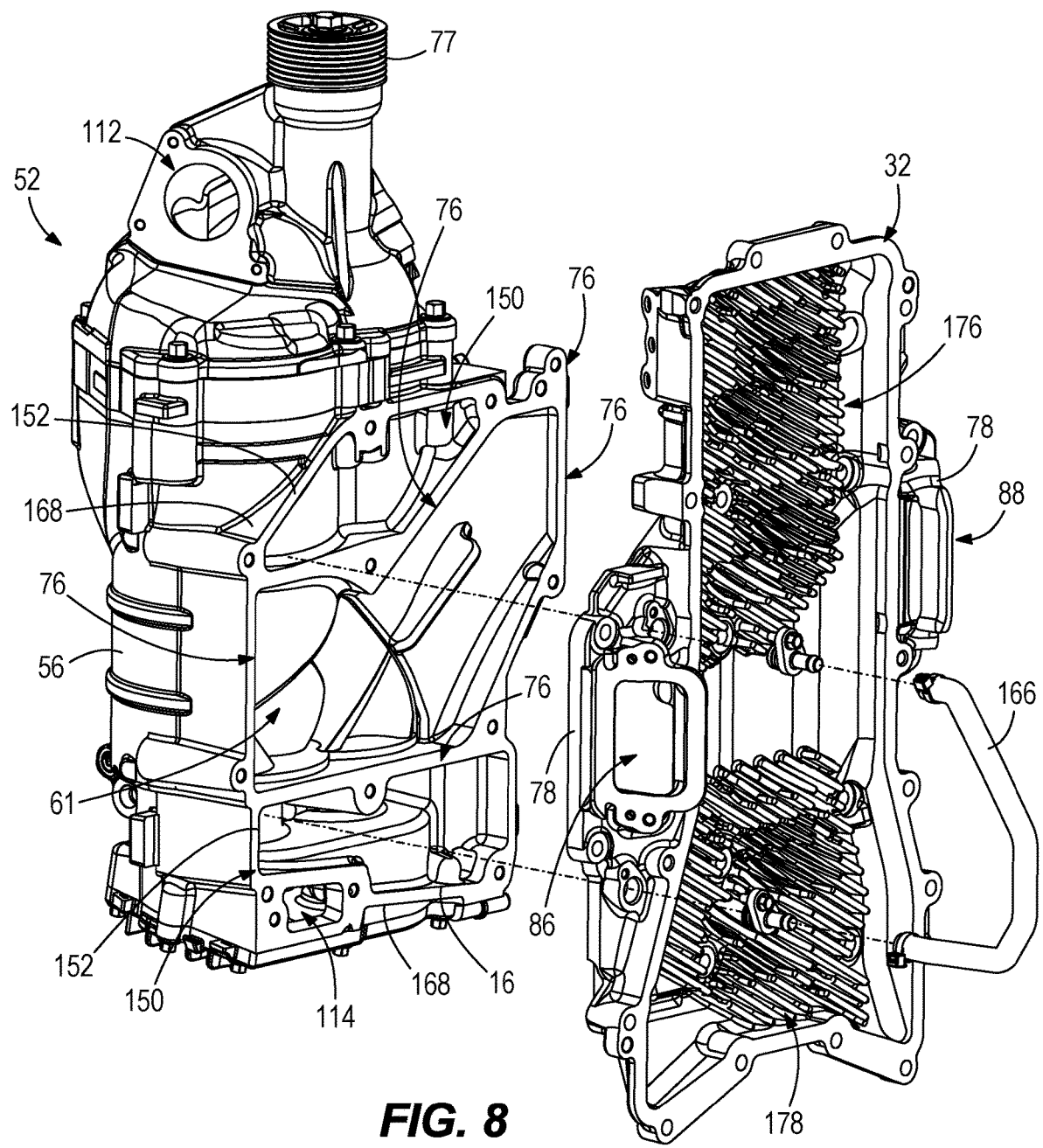
FIG. 8 is an exploded of the supercharger and crankcase cover shown in FIG. 7.
Figure 9:
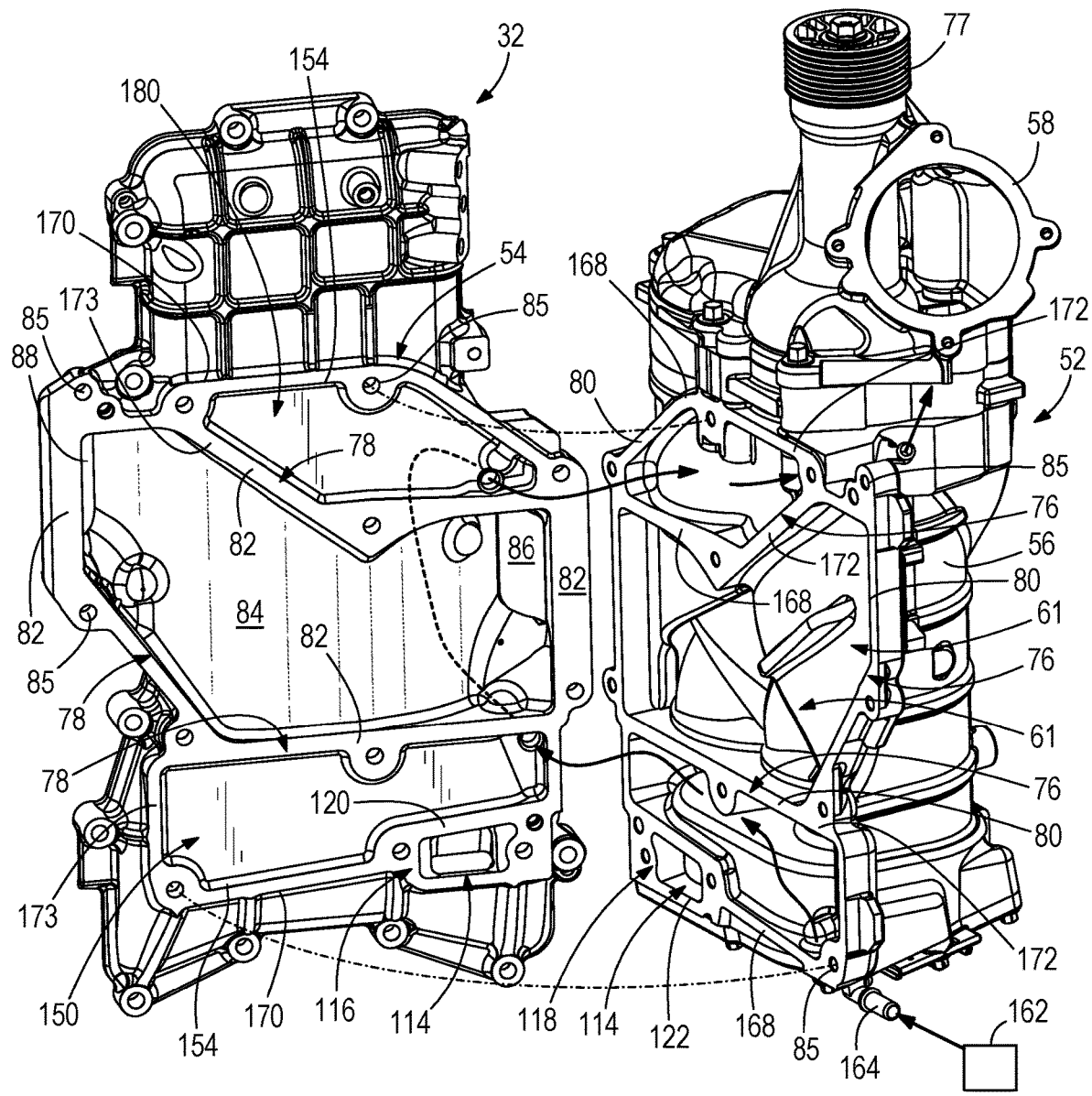
FIG. 9 is another exploded view of the supercharger and crankcase cover.

Referring to FIG. 8, the aftward side of the supercharger 52 has perimeter mounting flanges 76 that define a radially outer boundary of a portion of the central duct. Referring to FIG. 9, corresponding perimeter mounting flanges 78 are provided on the crankcase cover 32 and further define a radially outer boundary of another portion of the central duct. The perimeter mounting flanges 76, 78 have respective outer surfaces 80, 82 that face each other when the supercharger 52 is mounted to the crankcase cover 32, as shown via dash-and-dot lines in FIG. 9. Bolt holes 85 are provided on the perimeter mounting flanges 76, 78 for receiving fasteners that mount the supercharger 52 to the crankcase cover 32. Providing the central duct through both the supercharger 52 and the crankcase cover 32 allows a more direct route for charge air, compared to the prior art, and thus advantageously allows for a smaller overall package size.

Referring to FIG. 9, the exterior mounting surface 54 of the crankcase cover 32 has a rounded (e.g., crowned) outer deflection surface 84 that is located within the boundary defined by the perimeter mounting flange 78. The outer deflection surface 84 is configured to split and deflect flow of the charge air from the charge air outlet 61, which is an axial flow along outlet axis 74, towards port and starboard ducts 86, 88 (see FIG. 8) on port and starboard sides of the powerhead 22. Referring to FIG. 8, the port and starboard ducts 86, 88 are formed through opposite (port and starboard) sides of the crankcase cover 32, and particularly through sidewalls of the noted perimeter mounting flanges 78 and by sidewalls of the supercharger 52. Thus the outlet ducting for the charge air is partially formed in the crankcase cover 32 and partially formed in the supercharger 52, thereby advantageously negating a need for other space-consuming ducting and minimizing bolted joints.

Figure 10:
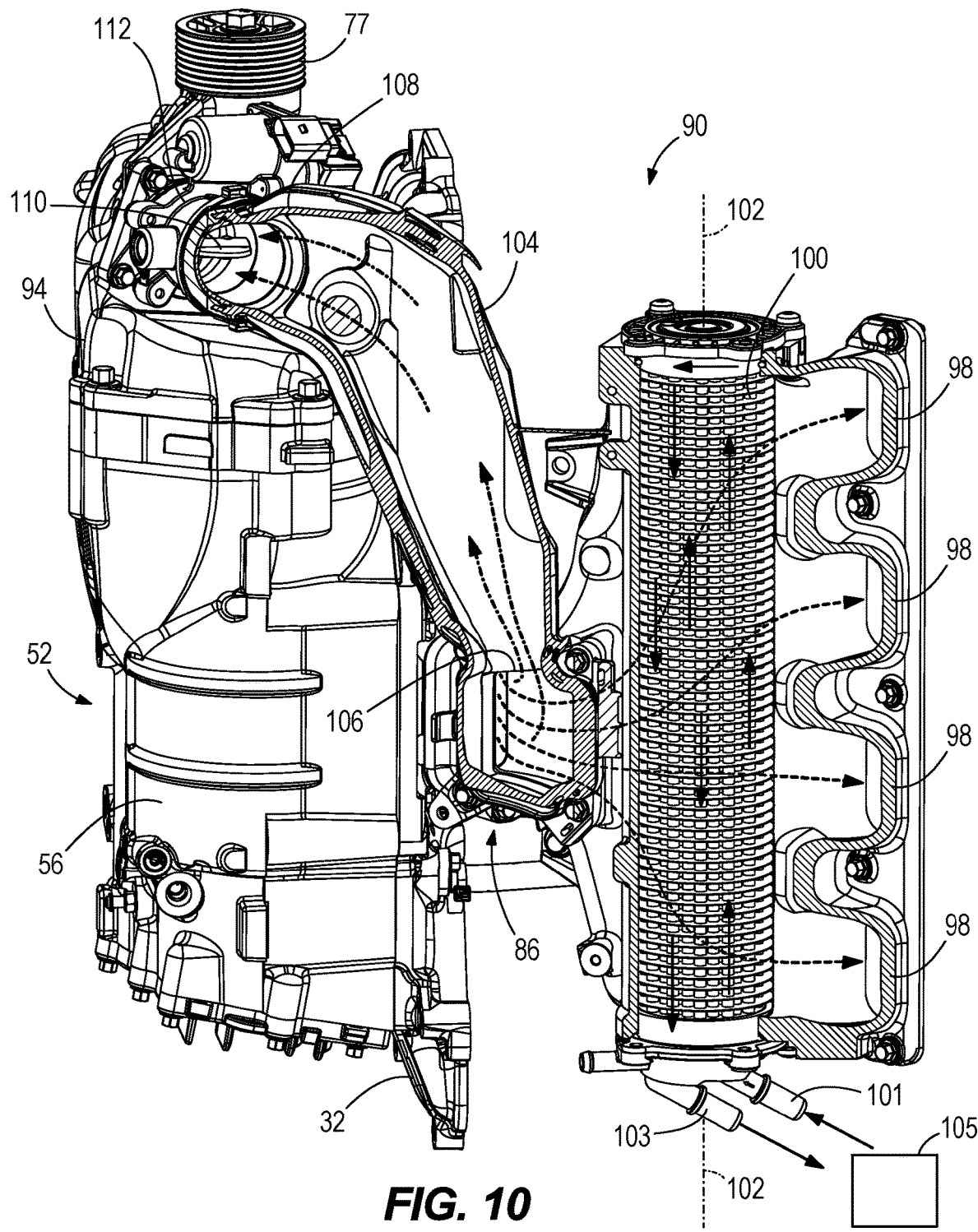
FIG. 10 is a view of Section 10-10, shown in FIG. 3, showing distribution of charge air to a port charge air cooler on the outboard marine engine, and recirculation of charge air to the supercharger.

Referring to FIGS. 6 and 10, the marine engine 20 further includes port and starboard charge air coolers 90, 92 located on opposite (port and starboard) sides of the powerhead 22. The port and starboard charge air coolers 90, 92 are configured to cool the charge air from the port and starboard ducts 86, 88, respectively, prior to discharge to the powerhead 22. Each of the port and starboard charge air coolers 90, 92 includes a body 94 that is elongated from top to bottom relative to the crankshaft axis 38. The body 94 has an upstream inlet 96 (see FIGS. 4 and 5) which is coupled via a floating, gasket joint 97 on of the port and starboard ducts 86, 88 so that the upstream inlet 96 directly receives the charge air from the respective one of the port and starboard ducts 86, 88. The body 94 has a plurality of downstream outlets 98 that are vertically aligned and discharge the charge air to the respective cylinder head 26 and more particularly to respective vertically aligned cylinders of the engine block 24, for combustion therein. The upstream inlet 96 is generally centrally located with respect to the elongated body 94 and conveys the charge air across an air-to-water cooling apparatus in the respective charge air cooler 90, 92. Referring to FIG. 10, the port and starboard charge air coolers 90, 92 each has a plurality of cooling passages 100 that convey cooling water upwardly from a cooling water inlet 101 and back downwardly in the body 94 to a cooling water outlet 103, as shown by arrows. A cooling water pump 105 is configured to draw relatively cold cooling water from the body of water in which the outboard motor is operating and pump the cooling water through the cooling passages 100. The cooling passages 100 are spaced apart from each other and are located with respect to the upstream inlet 96 and downstream outlets 98 such that the charge air flows transversely through the spaces between the cooling passages 100, as shown by dashed arrows in FIG. 10. In other words, each of the port and starboard charge air coolers 90, 92 is elongated so that it extends along a charge air cooler axis 102 that is parallel to the crankshaft axis 38. The cooling passages 100 are configured to convey the cooling water in opposite directions (e.g. up and down) and parallel to the charge air cooler axis 102. The charge air is conveyed through the charge air cooler 90, 92, transversely to the charge air cooler axis 102 and across the cooling passages 100. Flow of the charge air through the spaces between the cooling passages 100 promotes an exchange of heat between the relatively warm charge air and the relatively cold cooling passages 100, thus cooling the charge air prior to distribution to the powerhead 22 for combustion.

Referring to FIG. 10, a recirculation passage 104 recirculates a flow of charge air from the port duct 86 back to the supercharger 52. In particular, the recirculation passage 104 has an inlet 106 connected to the starboard charge air cooler 90, downstream of the port duct 86. The recirculation passage 104 extends upwardly relative to the crankshaft axis 38 to an outlet 108 located near the top of the starboard side of the supercharger 52. A valve 110 is located at the outlet 108 and is configured to control recirculation flow of charge air back to the supercharger 52 via an inlet 112 (see FIG. 8) to which the outlet 108 is connected. The valve 110 is utilized to control the pressure of the charge air in both charge air coolers 90, 92. Opening the valve 110 allows pressurized charge air to be conveyed via passage 104 back to the low pressure inlet side of the supercharger 52, as indicated by dash-and-dot lines in FIG. 10. The valve 110 is controlled by an engine control unit associated with the marine engine 20 and is positioned into and between open, partially open and closed positions accordingly based on power demand of the marine engine, charge air temperature, and/or other parameters associated with the marine engine 20.

Figure 13:
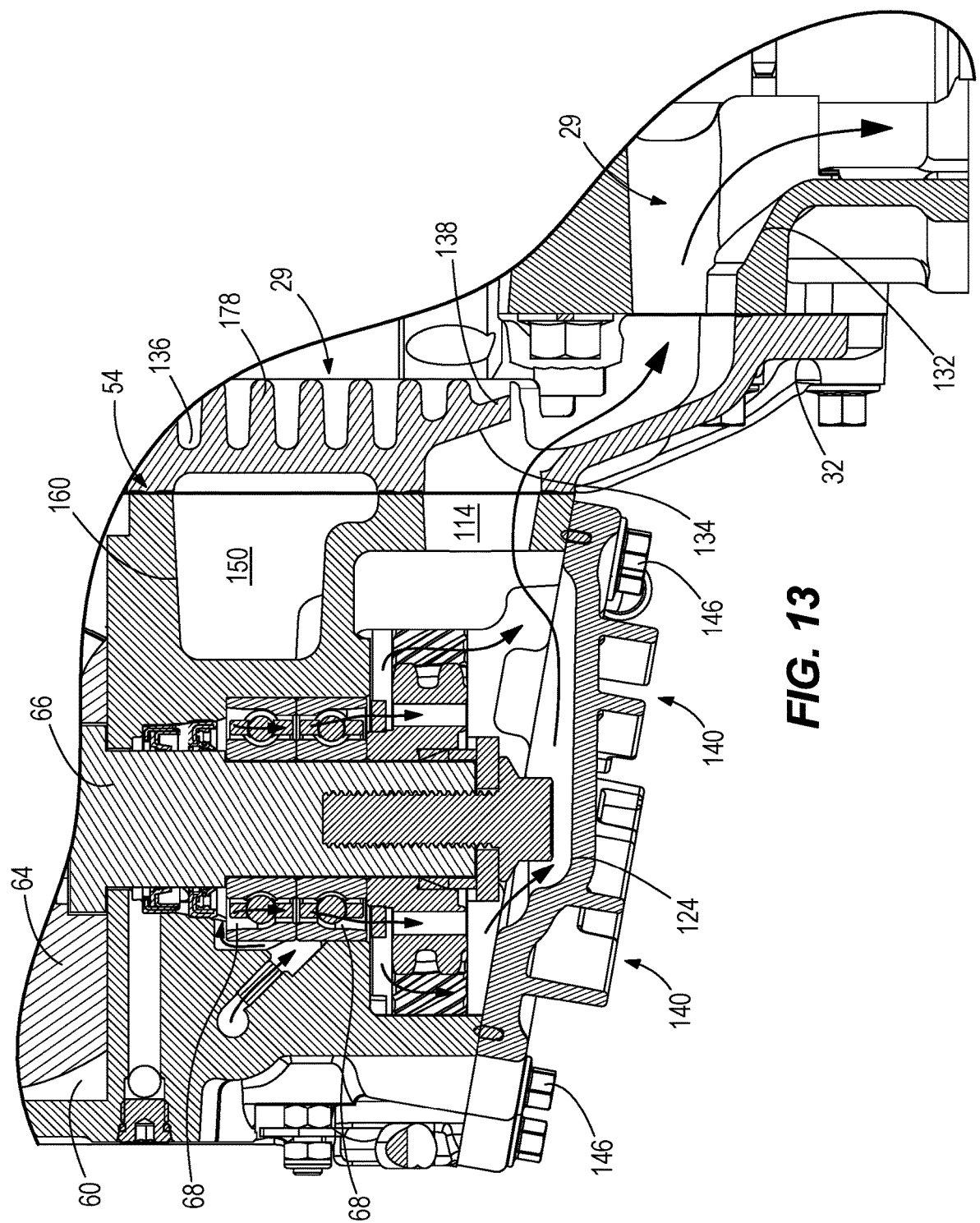
FIG. 13 is closer view of FIG. 12, showing flow of lubricant from the supercharger to the crankcase.

Referring now to FIGS. 11-13, the supercharger 52 is lubricated via lubricant (e.g., oil) from the powerhead 22. In the illustrated example, the lubricant is supplied to the supercharger 52 via a hose conduit from a lubricant gallery in the port cylinder head. The lubricant drains down the supercharger 52, as shown, and then back to the crankcase 28. Through research and experimentation, the present applicant have determined that the rate of lubricant draining out of the supercharger 52 can be negatively influenced by lubricant slinging off of the crankshaft 30 in the crankcase 28. The applicant found that if the lubricant does not properly drain from the supercharger 52 fast enough, the lubricant in the supercharger 52 heats up and can degrade. Also, the bearings 68 in the supercharger 52 and seals for the supercharger 52 can degrade. In certain instances this can also drive oil out of the supercharger vents, which is undesirable. According to the present disclosure, a novel drainage port 114 is provided, which is configured to efficiently and effectively drain lubricant from the supercharger 52 to the crankcase 28. The drainage port 114 is formed through the body 56 of the supercharger 52 and through the exterior mounting surface 54 of the crankcase cover 32. As shown in FIG. 9, the crankcase cover 32 has a perimeter mating flange 116 that defines a radially outer boundary of the drainage port 114. The supercharger 52 has a corresponding perimeter mating flange 118 that defines a radially outer boundary of the drainage port 114. The perimeter mating flange 116 and the perimeter mating flange 118 have corresponding outer surfaces 120, 122 that face each other when the supercharger 52 is mounted to the crankcase cover 32, as shown in FIGS. 12 and 13. The drainage port 114 is located below the lowermost connecting rod and crankshaft counterweight in the crankcase 28, See FIG. 12.

As described herein above, the supercharger cavity 60 contains the first and second rotors 62, 64 that are each supported by the noted upper and lower bearings 68 (upper bearings not shown). The supercharger cavity 60 is configured such that lubricant in the supercharger 52 drains by gravity downwardly onto the upper and lower bearings 68, to a sloped floor 124 of the supercharger cavity 60, and then to the drainage port 114. In particular, as shown by arrows in FIGS. 11 and 13, the lubricant is conveyed through a lateral gallery passage 126 and then is drained and/or sprayed via restricted (i.e., narrowed) branch passages 128 and/or nozzles 130 onto the bearings 68 and onto the gears 70, 72. The lubricant drains from these areas by gravity to the sloped floor 124 of the supercharger cavity 60 and then to the drainage port 114. The crankcase 28 also contains lubricant, as is conventional, which drains by gravity downwardly to a floor 132 of the crankcase cavity 29. The floor 124 of the supercharger cavity 60 is sloped towards the crankcase 28 so as to cause the lubricant to drain towards the drainage port 114. The floor of the crankcase cavity 29 is sloped generally towards the crankshaft axis 38 so as to cause the lubricant to drain away from the drainage port 114. Thus, the lubricant efficiently drains from the supercharger cavity 60, through the drainage port 114, and along the crankcase cavity 29 for conveyance to an (not shown) underlying conventional lubricant sump.

Referring to FIGS. 12 and 13, a lower deflection surface 134 is located in the crankcase 28, more particularly on the crankcase cover 32, adjacent to the drainage port 114. The lower deflection surface 134 transversely protrudes into the drainage port 114 and is configured to deflect lubricant from the drainage port (i.e. lubricant from the supercharger cavity 60 downwardly towards the floor 132 of the crankcase cavity 29 and noted sump. The lubricant in the crankcase cavity 29 drains down a forward internal surface 136 of the crankcase cover 32 and onto an upper deflection surface 138 located oppositely from the lower deflection surface 134. The upper deflection surface 138 deflects the lubricant aftwardly, causing it to merge with the lubricant that has already flowed through the drainage port 114 in an efficient manner, for further drainage together to the underlying sump. The lubricant is caused to efficiently drain back to the crankcase 28 at a location that is below the lowest conrod and counterweight of the crankshaft 30 (see FIG. 12). The lubricant drains through the drainage port 114, which has the louvered or shrouded opening, as described above. The special location and configuration (including shape) of the drainage port 114 prevents the lubricant coming off the crankshaft 30 from splashing into (or impinging onto) the flow of lubricant coming out of and creating a backpressure on the drainage port 114.

Referring to FIGS. 12 and 13, a plurality of retention features 140 are located on the exterior surface 142 of the floor 124 of the supercharger cavity 60. The retention features 140 include flanges 144 that are spaced apart from each other and configured to retain wires and/or hoses for the marine engine 20, in particular for precise placement of those wires and hoses during assembly of the marine engine 20. The configuration of these items advantageously prevents pinching of the wires and hoses during assembly and chafing of the wires and hoses during operation of the marine engine 20. In this example, the floor 124 of the supercharger cavity 60 is removably attached to the body 56 of the supercharger 52 by removable fasteners 146, which allows easy access for serviceability of the meshed gears 70, 72.

Figure 7:
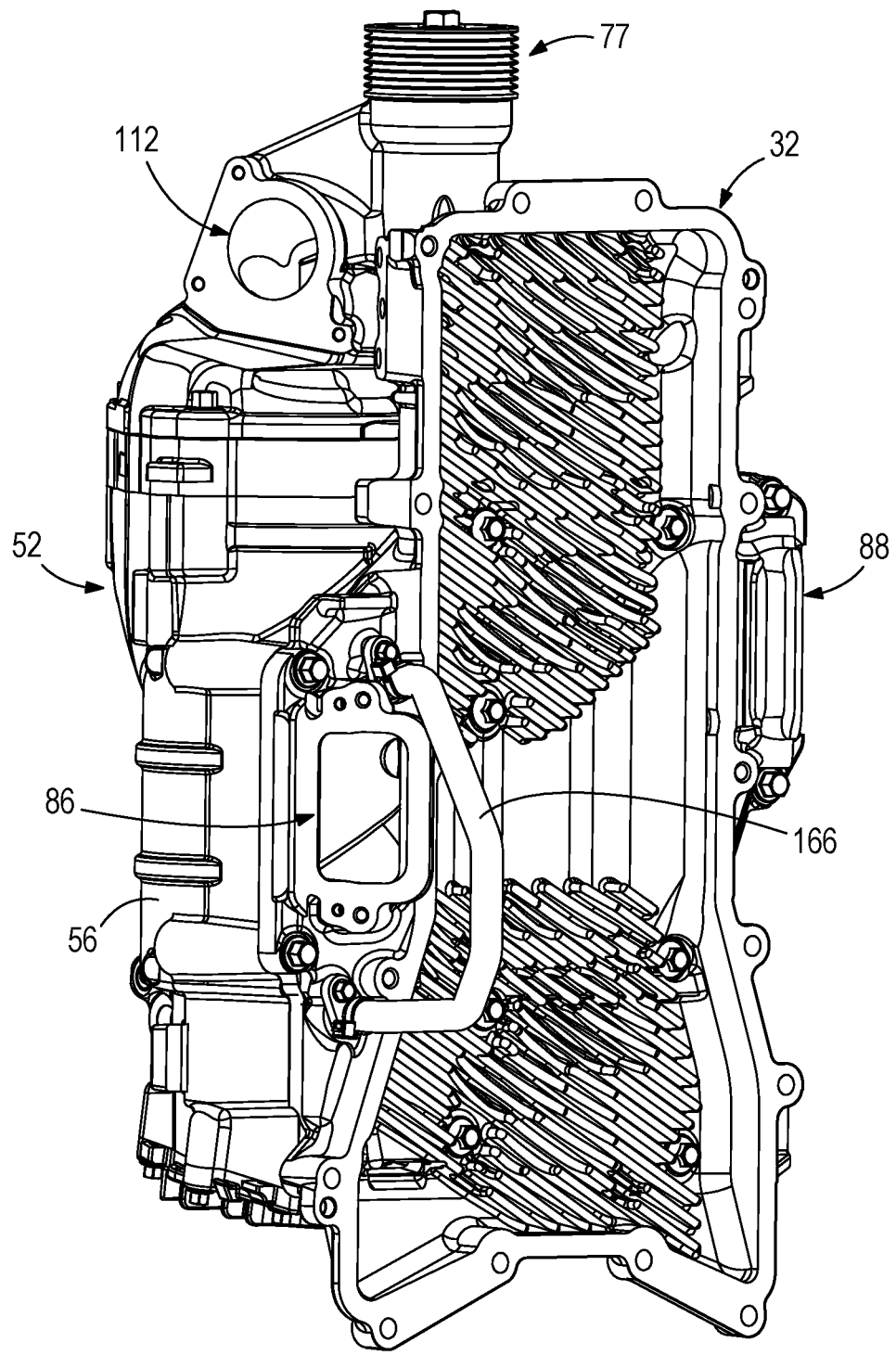
FIG. 7 is a view of a supercharger mounted on a crankcase cover of the outboard marine engine.

During research and experimentation, the present applicant has also determined that both the lubricant slinging off the cranktrain in the crankcase 28 and the charge air discharged from the supercharger 52 are typically very hot, and it is preferable to keep these two heat sources insulated from each other. The present applicant found it to be beneficial to keep both of these heat sources as cool as possible. However, to maintain a small package size of the marine engine and thus discharge charge air towards the crankcase 28, the applicant found it to be challenging to properly insulate these two heat sources. Through research and experimentation, the applicant realized a cooling apparatus can be incorporated between the charge air outlet and the crankcase, and also add improved charge air coolers to thereby keep the charge air suitably cool, and add an oil cooler to keep the lubricant suitably cool. Referring to FIGS. 7-9, a novel cooling passage 150 conveys cooling fluid (e.g., water from the body of water in which the marine engine 20 is operated) between the crankcase cover 32 and the supercharger 52 so that the cooling fluid cools both the metal of the supercharger 52, crankcase cover 32, lubricant in the crankcase 28 and the lubricant in the supercharger 52. During research and experimentation, the present applicant has found that cooling of the supercharger 52 allows for smaller clearance space between the internal surfaces of the supercharger 52 and the rotors 62, 64, which increases efficiency. Compressing the air creates heat, so the supercharger 52 naturally gets hot, and as it does it becomes less efficient. Cooling the supercharger 52 thus increases efficiency. Cooling the supercharger 52 also provides secondary benefits including cooling of associated bearings, seals, lubricant, charge air, etc. The cooling passage 150 is defined by a cooling jacket having a first (forward) side 152 on the supercharger 52 (see FIG. 8) and an opposite, (i.e., aftward) second side 154 on the crankcase cover 32. The first and second sides 152, 154 are configured such that coupling the supercharger 52 to the crankcase cover 32 (as shown in dash-and-dot lines in FIG. 9) encloses the cooling passage 150.

The cooling passage 150 is advantageously located adjacent to the charge air outlet 61 and particularly on opposite sides of the noted central duct such that the cooling fluid cools the charge air as it is conveyed from the supercharger 52 towards the respective charge air coolers 90, 92. Referring to FIG. 12, the cooling passage 150 is defined by an axially upper cooling jacket 158 and an axially lower cooling jacket 160, which are spaced apart from each other. The axially upper and lower cooling jackets 158, 160 are on axially opposite sides of the charge air outlet 61 such that the charge air outlet 61 is located axially between the upper and lower cooling jackets 158, 160. A pump 162 (see FIG. 9) pumps cooling fluid into the cooling passage 150 from a body of water in which the marine engine 20 is operated. The pump 162 is connected to the lower cooling jacket 160 via an inlet port 164. A cooling line 166 (e.g., hose, see FIG. 8) conveys the cooling fluid from the lower cooling jacket 160 to the upper cooling jacket 158 when the marine engine 20 and/or pump 162 is operating. The cooling line 166 also drains cooling water from the upper cooling jacket 158 to the lower cooling jacket 160 when the marine engine 20 and/or pump 162 stop operating. In embodiments where the cooling fluid is water, all of the cooling water is advantageously drained back to the body of water in which the marine engine 20 is operating in a conventional manner. Referring to FIG. 9, perimeter mating flanges 168, 170 on the supercharger 52 and crankcase cover 32 surround the respective upper and lower cooling jacket 158, 160. Each of the perimeter mating flanges 168, 170 have outer surfaces 172, 173 that face each other when the supercharger 52 is mounted to the crankcase cover 32.

Referring to FIGS. 8 and 12, fins are located on the forward internal surface 136 of the crankcase cover 32, opposite the cooling passage 150. The fins are configured to facilitate heat exchange between the cooling fluid and the lubricant in the crankcase 28. In particular, FIG. 8 shows an axially upper plurality of fins 176 on the forward internal surface 136, opposite the axially upper cooling jacket 158. An axially opposite lower plurality of fins 178 is located on the forward internal surface 136, opposite the axially lower cooling jacket 160. Each of the first and second pluralities of fins 176, 178 are angled relative to the crankshaft axis 38, thereby facilitating drainage of the lubricant. During research and experimentation, the present inventors determined that it is advantageous to angle the pluralities of fins 176, 178 relative to the crankshaft 30. Doing so was found to facilitate better drainage of lubricant, which is flung off of the crankshaft 30 at a similar angle. The angled pluralities of fins 176, 178 were found to facilitate improved drainage compared to straight vertical or straight horizontal fins. The upper and lower pluralities of fins 176, 178 thus facilitate heat exchange between the cooling fluid and the lubricant in the crankcase 28. As shown in FIG. 12, the lower plurality of fins 176 is adjacent and smoothly transitions to the lower deflection surface 138, thus promoting drainage of the lubricant within the crankcase cavity 29. The area of the crankcase cover 32 located along the central duct for charge air (i.e. along the outer deflection surface 84) is devoid of cooling fins to minimize heat transfer in either direction.

As shown in FIG. 12, the cooling passage 150, and particularly as defined by the lower cooling jacket 160, is located adjacent to and in particular immediately above portions of the drainage port 114, thus facilitating heat exchange between the relatively cold cooling fluid and relatively hot lubricant. The cooling passage 150, and particularly as defined by the lower cooling jacket 160, is located between the central duct for conveying charge air from the supercharger 52 and the lubricant drainage surfaces in the supercharger 52 and crankcase cover 32, thus facilitating heat exchange between the relatively cold cooling fluid and relatively hot lubricant. As shown in FIGS. 8 and 9, a lower portion of the radially outer boundary of the lower cooling jacket 160 is located adjacent to and particularly immediately above an upper portion of the radially outer boundary of the drainage port 114.

The cooling passage 150 is thus advantageously configured to cool both the crankcase 28, including the crankcase cover 32, and the supercharger 52, including its housing, bearings, seals, and lubricant and charge air therein.

The crankcase cover 32 thus is configured to perform several advantageous functions, including: (A) containing lubricant splashing off the cranktrain, (B) supporting the supercharger, (C) forming part of the outlet duct of the supercharger, (D) splitting the flow of charge air into two branches, namely port and starboard branches, (E) forming part of the oil cavity of the supercharger gears and providing a path back to the crankcase for drainage of lubricant and (F) forming part of the water jackets for cooling fluid to enable cooling of the lubricant in the crankcase and the supercharger housing (particularly around the discharge outlet), and the outlet air of the supercharger.

The charge air coolers 90, 92 thus are configured to perform several advantageous functions, including: (A) supporting an air-to-water heat exchanger for cooling the charge air, (B) allowing for attachment of a bypass duct, (C) incorporating a manifold downstream of the heat exchanger to distribute air to multiple intake ports in the cylinder heads, (D) each charge air cooler sharing a same casting for efficient manufacturing, and (E) having inlet seals to a respective port or starboard discharge port on the crankcase cover. The supercharger 52 is advantageously configured to (A) compress charge air, (B) contain and drain lubricant, (C) forms part of the outlet duct and associates branches, (D) form part of the noted water jackets, (E) and accept direct mounting of the bypass valve.

The present disclosure thus provides a novel marine engine and supercharger combination that provides an efficient use of components and space. However in particular, it should be noted that while the application discloses embodiments wherein the cooling passage 150 is implemented in conjunction with the aftwardly facing central duct for charge air, in other embodiments the cooling passage 150 can be implemented with a supercharger having a forwardly facing duct for charge air.

Figure 14:
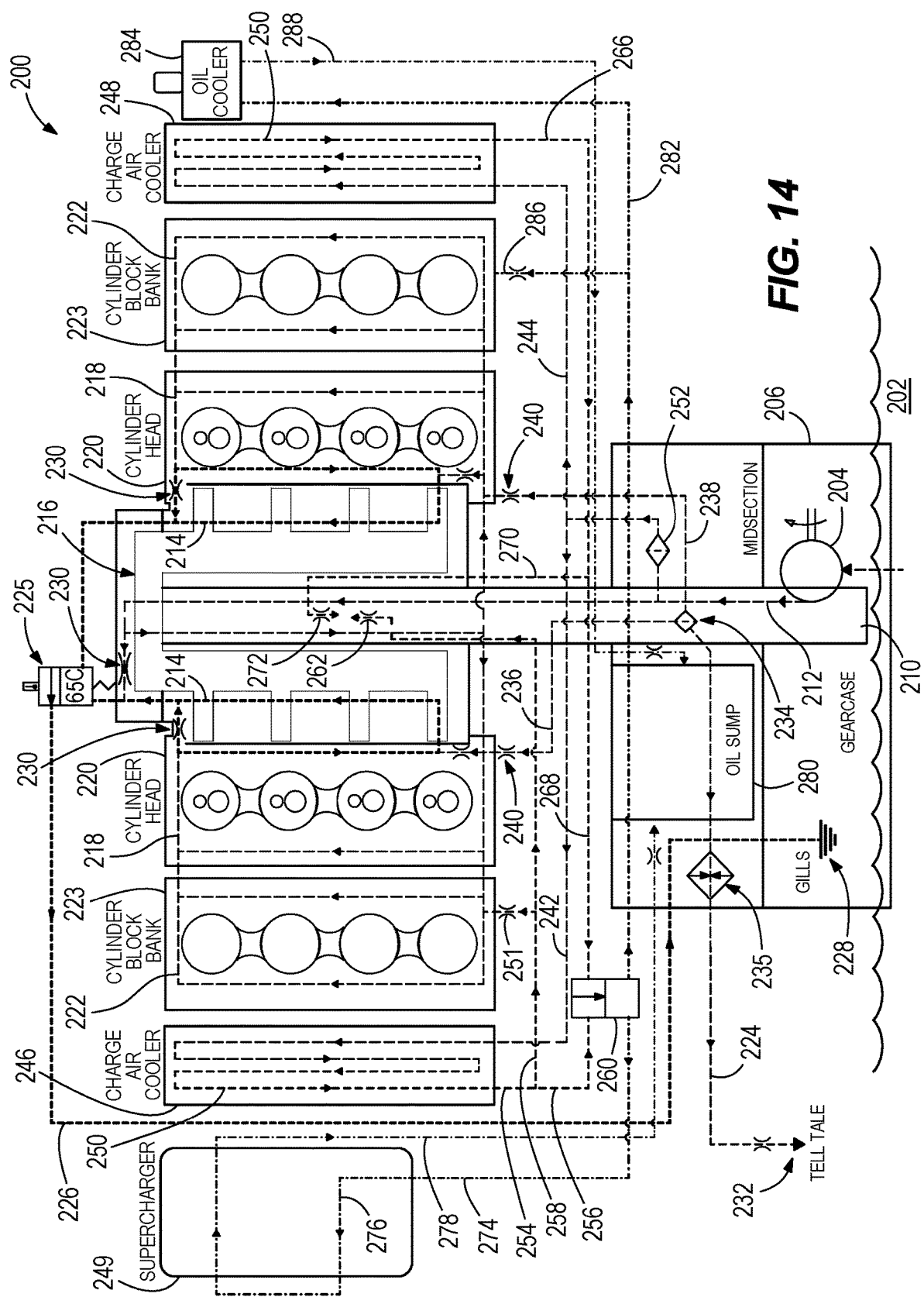
FIG. 14 is a schematic depiction of an exemplary cooling system for the outboard marine engine according to the present disclosure.

FIG. 14 is a schematic depiction of an exemplary cooling system 200 for a marine engine according to the examples provided herein above, which can be configured for use with an outboard motor. The cooling system 200 is particularly an "open loop" cooling system, which supplies relatively cold cooling water from the body of water 202 in which the outboard motor is operating to the marine engine and related components to thereby cool the marine engine and related components, and then returns relatively warm (i.e., "spent") cooling water to the body of water 202. Open loop cooling systems are known in the art and examples are disclosed in the presently-incorporated U.S. Pat. No. 9,403,588, among others. The cooling system 200 of FIG. 14 has various cooling water passages, conduits, branch passages, inlets, outlets, ports, and the like, which are depicted via dashed lines and dash-and-dot lines. These items can constitute conventional tubes, fittings, cast passages, jackets, bored holes, and/or the like. The particular configuration of the respective cooling water passages, conduits, branch passages, inlets, outlets, ports, and the like can vary as long as the item is capable of conveying cooling water and preforming the functions described herein below, all as will be understood by one having ordinary skill in the art.

The cooling system 200 includes a conventional cooling water pump 204, which is located in the lower gearcase 206 of the outboard motor. The cooling water pump 204 is coupled to a portion of the driveshaft that extends into the lower gearcase 206, and/or any other similar output component of the marine engine, in particular so that operation of the marine engine powers the cooling water pump 204 and thereby causes the cooling water pump 204 to draw cooling water into the lower gearcase 206, via for example inlet openings on the lower gearcase 206. In alternate examples, the cooling water pump 204 is an electric pump that is electrically-powered, for example by a battery. In both examples, the cooling water pump 204 pumps the cooling water upwardly through a cooling water passage 212 alongside the exhaust conduit 210 of the marine engine. In some examples, at least a portion of the cooling water passage 212 is defined by a cooling water jacket that is cast onto the exterior of the exhaust conduit 210. This type of arrangement is taught in the presently incorporated U.S. Pat. Nos. 9,365,274 and 10,336,428, among others, and thus is not further herein described. In the illustrated example, the cooling water passage 212 conveys the cooling water upwardly and then back downwardly alongside the exhaust conduit 210, and then to both port and starboard sides of the marine engine, particularly in series through cooling water passages 218 in the port and starboard cylinder heads 220, cooling water passages 222 in the port and starboard cylinder blocks 223, and then back through cooling water passages 214 alongside the port and starboard exhaust runners and/or exhaust log 216. Similar cooling water passage configurations are disclosed in the presently-incorporated U.S. Pat. Nos. 9,365,274 and 8,479,691. The cooling water passages 214 can be defined by for example cast cooling water passages on the exhaust runners and/or log 216. See for example the presently-incorporated U.S. Pat. No. 9,359,058. Cooling water flow directions are illustrated by arrowheads in FIG. 14.

A thermostat valve 225 is located on top of the exhaust conduit 210 and configured to automatically open and close based upon temperature so as to control discharge of the cooling water from the marine engine via an outlet passage 226, which leads to a discharge outlet 228 located on the lower gearcase 206 and discharging the cooling water back to the body of water 202. The thermostat valve 225 is thus configured to automatically control temperature of the marine engine. An example of such thermostatic control is provided in the presently incorporated U.S. Pat. No. 9,365,274. In some examples, the thermostat valve 225 is a conventional item that can be purchased from Mercury Marine, part number 8M0109002, which is configured to automatically open when the cooling water reaches a 65 degree Celsius threshold. Several orifices exist 230 at the high points of the coolant passages that are configured to allow air to bleed from the cooling water passage 212 via the thermostat valve 225, as is conventional and disclosed in the above-incorporated patents, particularly with reference to U.S. Pat. No. 9,650,937.

The cooling system 200 has a branch passage 224, which conveys a portion of the cooling water from the cooling water passage 212 to a telltale outlet 232 on the outboard motor, which as is conventional indicates to the operator whether cooling water is properly flowing through the cooling system 200 by continuously discharging a stream of cooling water back to the body of water 202 while the outboard motor is operating. The telltale outlet 232 is typically located on the outboard motor at a point that remains above the body of water 202 so that the stream of cooling water can be seen by the operator. A strainer 234 mounted on the exhaust conduit 210 strains the cooling water flow from the cooling water passage 212 to the branch passage 224. As shown in FIG. 14, the branch passage 224 conveys the cooling water through a cooler 235 for cooling a fuel pump and fuel that is supplied to the marine engine, for example as taught in the above-incorporated U.S. Pat. No. 10,047,661.

Branch passages 236, 238 convey the cooling water from the strainer 234 to orifices 240 on the port and starboard cylinder heads 220, which supply cooling water to the cooling water passages 218 in the cylinder heads 220, i.e., so as to merge with the above-described cooling water flowing through the cylinder heads 220. When the cooling water pump 204 is active, cooling water is conveyed to the cooling water passages 218 in the cylinder heads 220 via the orifices 240. When the cooling water pump 204 is inactive, the cooling water is permitted to drain by gravity from the cooling water passages 218 via the orifices 240 to a leak hole in the cooling water pump 204 and then back to the body of water 202.

Branch passages 242, 244 convey the cooling water from the cooling water passage 212 to port and starboard charge air coolers 246, 248, which as disclosed in the embodiments of FIGS. 1-13, are configured to cool charge air from supercharger 249 prior to discharge to the marine engine. As detailed herein above, the port and starboard charge air coolers 246, 248 each have cooling water passages 250, which convey the cooling water from the branch passages 242, 244, respectively, in four passes through the respective charge air cooler 246, 248. During operation of the outboard motor, the charge air is distributed across the four passes of the cooling water passages 250 prior to combustion in the marine engine, all as described herein above. A strainer 252 mounted on the exhaust conduit 210 strains the cooling water conveyed from the cooling water passage 212 to the branch passages 242, 244.

The cooling water from the port charge air cooler 246 is conveyed to a branch passage 254 and then to branch passages 256, 258, which convey cooling water respectively in parallel to a control valve 260 and to a sprayer 262 for spraying cooling water into the exhaust gas flowing through the exhaust conduit 210. The type and configuration of the control valve 260 can vary. In the presently illustrated embodiment, the control valve 260 is a poppet valve, one example being Mercury Marine part no. 8M0149190. The sprayer 262 is a known device, and is disclosed in the presently-incorporated U.S. Pat. Nos. 10,233,818 and 10,336,428, and thus is not further herein described. A portion of the cooling water flowing through the branch passage 258 is discharged to the port cylinder block 223 via a port 251 and mixes with the cooling water flowing through the cooling water passage 222 in the port cylinder block 223. When the cooling water pump 204 is inactive, the port 251 provides a drain for draining cooling water from the port cylinder block 223.

The cooling water from the starboard charge air cooler 248 is conveyed to a branch passage 266 and then to branch passages 268, 270, which convey cooling water respectively in parallel to the poppet valve 260 and to a sprayer 272 for spraying cooling water into the exhaust gas flowing through the exhaust conduit 210. Just like the sprayer 262, the sprayer 272 is a known configuration and is fully described in the presently-incorporated U.S. Pat. Nos. 10,233,818 and 10,336,428.

The poppet valve 260 is configured so as to actively control flow of cooling water from the branch passages 256, 268 to a branch passage 274, which feeds cooling water to a cooling water passage 276 for cooling the supercharger 249. In particular, the poppet valve 260 is configured to remain closed at relatively low operating pressures of the cooling system and to automatically open at relatively high pressures of the cooling system, for example at a preselected operating pressure that is chosen at setup of the marine engine so as to provide the necessary cooling water flow to components of the marine engine at higher operating pressures so as to prevent overheating thereof. Because of the parallel flow, regardless of whether the poppet valve 260 is open or closed, cooling water is continuously provided in parallel to the sprayers 262, 272. When the poppet valve 260 is closed, cooling water is not provided to the cooling water passage 276 for the supercharger 249. When the poppet valve 260 opens, cooling water is provided to the cooling water passage 276 for the supercharger 249. The cooling water passage 276 for the supercharger 249 can be configured in the manner described herein above with respect to embodiments of FIGS. 1-13. Further description of how the poppet valve 260 operates and the advantages thereof is provided herein below.

Cooling water from the cooling water passage 276 is conveyed by a branch passage 278 to the exterior surface of an oil sump 280 containing oil for lubricating the marine engine, for cooling the oil sump 280 and the oil contained therein. One example of an apparatus for cooling an oil sump is a series of orifices configured to spray cooling water onto the exterior of the oil sump 280. This type of configuration is known in the art. Reference is also made to the presently incorporated U.S. Pat. No. 9,365,274.

The poppet valve 260 is further configured to actively control flow of cooling water from the branch passages 256, 268 to a branch passage 282, which conveys the cooling water to an oil cooler 284 for cooling oil for lubricating the marine engine. A portion of the cooling water in the branch passage 282 is supplied to the starboard cylinder block 223 via a port 286 for mixing with the cooling water flowing through the cooling water passage 222 in the starboard cylinder block 223. When the cooling water pump 204 is inactive, the port 286 provides a drain for draining cooling water from the starboard cylinder block 223. Cooling water from the oil cooler 284 is conveyed by a branch passage 288 to the oil sump 280, for cooling of the oil sump 280 along with the cooling water from the branch passage 278.

During research and development for the above-described embodiments, the present inventors determined that available cooling water flow rate is limited by the capacity of the cooling water pump. Also, the charge air coolers require a significant amount of cold cooling water for optimal performance. The present inventors also recognized that diverting cooling water to the charge air coolers from the exhaust system and/or the powerhead can negatively impact system performance and/or reduce pressure in the cooling system to unacceptable levels. To solve these problems, the present inventors realized that it would be possible and advantageous to circulate the cooling water to the charge air coolers first, and in parallel to the main cooling passages through the marine engine, and first in series relative to the exhaust sprayers. The present inventors also realized that the charge air coolers require more cooling water than the sprayers, so the inventors added the presently disclosed control valve (e.g., poppet) to the cooling system in parallel with the sprayers, which thereby advantageously opens and increases flow of cooling water through the charge air coolers when the operating pressure of the cooling system is at a sufficient level (i.e., at a predetermined above-idle speed, e.g., 2500 rpm). The present inventors further realized it would be advantageous to discharge the cooling water from the control valve to other components requiring cooling, including for example the supercharger, the dedicated oil cooler, the oil sump (i.e., "driveshaft housing shower"), and also through a fixed orifice back to the body of water in which the marine engine is operating.

Embodiments of the above-described cooling water systems were found by the present inventors to achieve significant performance advantages. For example, locating the exhaust sprayers in the cooling system downstream of the charge air coolers but before the control valve benefits low speed engine performance and rapid accelerating from a stop by permitting at least some water to flow through the charge air coolers at low speeds. This essentially keeps the cooling system primed with cool water. However flow rate is reduced from normal higher speed operation, which keeps the engine ports at a higher temperature and reduces fuel vapor from condensing on the interior surfaces of the intake ports or charge air cooler. Low speed exhaust sprayer flow is advantageously guaranteed due to the higher system pressure with the poppet closed. High speed engine performance is also maximized since the cooling water for the exhaust sprayers, dedicated oil cooler, and supercharger flows first through the charge air coolers. The flow of cooling water is effectively prioritized for high speed operation based on heat rejection. That is, it was found that the charge air coolers require the coldest water and thus are placed first (i.e. upstream) in the system. It was found that the exhaust sprayers can utilize the relatively warmer water from the charge air coolers and thus are placed downstream relative to the charge air coolers. The supercharger and the dedicated oil cooler are relatively hot components compared to the cooling water (i.e. have a high delta temperature) and so it was found that these components can utilize the relatively warmer cooling water and thus be located downstream of other components in the cooling system. Further, the present inventors determined that the relatively warm cooling water downstream of these components can still be useful for cooling the oil sump. With these arrangements, the present inventors also realized that locating the oil cooler and the supercharger cooling passages after the poppet valve provides the following advantages: (1) Low speed oil temperature can warm up to a higher normalized point since there is less heat rejection from the oil cooler or supercharger cooler and (2) high speed performance allows maximum oil cooling and system pressure to be maintained due to ram pressure at the gearcase.

The present disclosure thus provides cooling systems for cooling a marine engine having an engine block and a cylinder head, and a supercharger configured to provide charge air for combustion in the marine engine. The cooling systems can have a charge air cooler configured to cool the charge air prior to combustion in the marine engine. The cooling systems can be configured to circulate cooling water from a body of water in which the marine engine is operating to the marine engine and then back to the body of water. A cooling water pump configured to pump the cooling water through the cooling system. The cooling water pump is coupled to a crankshaft of the marine engine, and wherein rotation of the crankshaft causes the cooling water pump to pump the cooling water. The cooling system can further be configured to convey the cooling water in parallel to the marine engine and the charge air cooler. A sprayer is configured to spray the cooling water into exhaust gas discharged from the marine engine. The cooling system can be configured to convey the cooling water in series to the charge air cooler and then to the sprayer. The cooling system can further be configured to convey the cooling water from the charge air cooler in parallel to a control valve and to the sprayer. The control valve is configured to automatically discharge the cooling water to the cooling passage for cooling the supercharger based upon an operating condition of the cooling system, for example at a predetermined operating pressure of the cooling system.

In certain examples, the control valve is a poppet valve configured to automatically open based upon pressure of the cooling water. The control valve is configured to automatically discharge the cooling water to the cooling passage for cooling the supercharger and to an oil cooler for cooling the oil lubricating the marine engine. The cooling passage for cooling the supercharger and the oil cooler both discharge the cooling water onto the exterior surfaces of an oil sump for cooling an oil sump for the marine engine.

In certain examples, the cooling system has a cooling passage for cooling a fuel pump of the marine engine, wherein the cooling system conveys the cooling water in parallel to the cooling passage for cooling the fuel pump and to the charge air coolers. The cooling system conveys the cooling water from the cooling passage for cooling the fuel module to a telltale outlet for the marine engine.

The present disclosure thus teaches circulating cooling water from a body of water in which the marine engine is operating to the marine engine and then back to the body of water; and circulating the cooling water in parallel to a charge air cooler configured to cool the charge air prior to combustion in the marine engine and to a sprayer configured to spray cooling water into exhaust gas conveyed from the marine engine. The present disclosure further teaches discharging the cooling water from the charge air cooler to a cooling passage for cooling the supercharger. The present disclosure further teaches preventing circulation of the cooling water to the cooling passage for the supercharger when the marine engine is operating at idle speed and automatically allowing circulation of the cooling water (via the poppet valve) to the cooling passage for the supercharger when the marine engine is operating at a predetermined above-idle speed. The present disclosure further teaches continuously spraying cooling water into the exhaust gas regardless of whether cooling water is being discharged to the cooling passage for the supercharger or to the oil cooler (via the poppet valve), and circulating the cooling water to a cooling passage associated with a fuel module for the marine engine, in parallel relative to the charge air coolers, and conveying the cooling water from the cooling passage associated with the fuel module to a telltale outlet for the marine engine.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A cooling system for cooling a marine engine having an engine block and a cylinder head, and a supercharger configured to provide charge air for combustion in the marine engine, the cooling system comprising:
   a charge air cooler configured to cool the charge air prior to combustion in the marine engine, wherein the cooling system is configured to circulate cooling water from a body of water in which the marine engine is operating to the marine engine and then back to the body of water, and wherein the cooling system is further configured to convey the cooling water in parallel to the marine engine and the charge air cooler;
   at least one sprayer configured to spray the cooling water into exhaust gas discharged from the marine engine, wherein the cooling system is configured to convey the cooling water in series to the charge air cooler and then to the sprayer; and
   a control valve, wherein the cooling system is configured to convey the cooling water from the charge air cooler in parallel to the control valve and to the sprayer.

2. The cooling system according to claim 1, wherein the control valve is configured to automatically discharge the cooling water to a cooling passage for cooling the supercharger based on an operating condition of the cooling system.

3. The cooling system according to claim 2, wherein the cooling passage for cooling the supercharger discharges the cooling water to an exterior surface of an oil sump for cooling the oil sump for the marine engine.

4. The cooling system according to claim 1, wherein the control valve is configured to automatically discharge the cooling water to the cooling passage for cooling the supercharger at an operating pressure of the cooling system.

5. The cooling system according to claim 4, wherein the operating pressure of the cooling system is an operating pressure that occurs when the marine engine is operated at an above-idle speed.

6. The cooling system according to claim 1, wherein the control valve comprises a poppet valve configured to automatically open based upon a pressure of the cooling water.

7. The cooling system according to claim 1, wherein the control valve is configured to automatically discharge the cooling water to an oil cooler for cooling oil for lubricating the marine engine.

8. The cooling system according to claim 7, wherein the control valve is configured to automatically discharge the cooling water to the oil cooler based on an operating condition of the cooling system.

9. The cooling system according to claim 1, further comprising a cooling water pump configured to pump the cooling water through the cooling system, wherein the cooling water pump is coupled to a crankshaft of the marine engine, and wherein rotation of the crankshaft causes the cooling water pump to pump the cooling water.

10. The cooling system according to claim 1, further comprising a cooling passage for cooling a fuel pump of the marine engine, wherein the cooling system conveys the cooling water in parallel to the cooling passage for cooling the fuel pump and to the charge air coolers.

11. The cooling system according to claim 10, further comprising a telltale outlet for the marine engine, wherein the cooling system conveys the cooling water from the cooling passage for cooling the fuel module to the telltale outlet.

12. A method for cooling a marine engine having an engine block and a cylinder head, and a supercharger configured to provide charge air for combustion in the marine engine, the method comprising:
   circulating cooling water from a body of water in which the marine engine is operating to the marine engine and then back to the body of water;
   circulating the cooling water in series to a charge air cooler configured to cool the charge air prior to combustion in the marine engine and then to a sprayer configured to spray cooling water into exhaust gas conveyed from the marine engine; and
   discharging the cooling water from the charge air cooler to the sprayer and in parallel to a cooling passage for cooling the supercharger.

13. The method according to claim 12, further comprising preventing circulation of the cooling water to the cooling passage for the supercharger when the marine engine is operating at idle speed and automatically allowing circulation of the cooling water to the cooling passage for the supercharger when the marine engine is operating at an above-idle speed.

14. The method according to claim 12, further comprising continuously spraying cooling water into the exhaust gas regardless of whether cooling water is discharged to the cooling passage for the supercharger.

15. The method according to claim 12, further comprising circulating the cooling water to a cooling passage associated with a fuel module for the marine engine, in parallel to the charge air cooler.

16. The method according to claim 15, further comprising conveying the cooling water from the cooling passage associated with the fuel module to a telltale outlet for the marine engine.

17. An outboard motor comprising a marine engine having an engine block and a cylinder head, and a supercharger configured to provide charge air for combustion in the marine engine, wherein the outboard motor comprises:
   a cooling system configured to circulate cooling water from a body of water in which the outboard motor is operated and then back to the body of water;
   a charge air cooler configured to cool the charge air prior to combustion in the marine engine, and wherein the cooling system is configured to convey the cooling water in parallel to the marine engine and the charge air cooler;
   at least one sprayer configured to spray the cooling water into exhaust gas discharged from the marine engine, wherein the cooling system is configured to convey the cooling water in series to the charge air cooler and then to the sprayer; and
   a control valve, wherein the cooling system is configured to convey the cooling water from the charge air cooler in parallel to the control valve and to the sprayer.

18. The outboard motor according to claim 17, wherein the control valve is configured to automatically discharge the cooling water to the cooling passage for cooling the supercharger based upon an operating pressure of the cooling system.

19. The outboard motor according to claim 18, wherein the operating pressure of the cooling system is an operating pressure that occurs when the marine engine is operated at an above-idle speed.

20. The outboard motor according to claim 17, wherein the control valve comprises a poppet valve configured to automatically open based upon pressure of the cooling water.

21. A method for cooling a marine engine having an engine block and a cylinder head, and a supercharger configured to provide charge air for combustion in the marine engine, the method comprising:
   circulating cooling water from a body of water in which the marine engine is operated to the marine engine and then back to the body of water;
   conveying the cooling water in parallel to the marine engine and to a charge air cooler configured to cool the charge air prior to combustion in the marine engine; and
   conveying the cooling water from the charge air cooler in parallel to at least one sprayer configured to spray the cooling water into exhaust gas discharged from the marine engine and to a control valve configured to automatically discharge the cooling water.

22. The method according to claim 21, wherein the control valve is configured to automatically discharge the cooling water based upon an operating pressure of the cooling system.

23. The method according to claim 21, wherein the control valve comprises a poppet valve.

24. The method according to claim 21, wherein the control valve is configured to automatically discharge the cooling water to the cooling passage for cooling the supercharger based upon an operating pressure.

\* \* \* \* \*